(12) United States Patent
Isaacs

(10) Patent No.: US 9,444,857 B2
(45) Date of Patent: Sep. 13, 2016

(54) SYSTEMS AND METHODS FOR IMPLEMENTING INSTANT SOCIAL IMAGE COBROWSING THROUGH THE CLOUD

(71) Applicant: salesforce.com, inc., San Francisco, CA (US)

(72) Inventor: Charles Hart Isaacs, San Jose, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/937,704

(22) Filed: Nov. 10, 2015

(65) Prior Publication Data

US 2016/0065632 A1 Mar. 3, 2016

Related U.S. Application Data

(62) Division of application No. 14/039,689, filed on Sep. 27, 2013, now Pat. No. 9,185,342.

(60) Provisional application No. 61/711,916, filed on Oct. 10, 2012.

(51) Int. Cl.
*H04N 7/14* (2006.01)
*H04L 29/06* (2006.01)
*H04M 3/51* (2006.01)
*H04W 4/00* (2009.01)
(Continued)

(52) U.S. Cl.
CPC ......... *H04L 65/4015* (2013.01); *G06F 3/0484* (2013.01); *G06F 3/0488* (2013.01); *H04L 45/3065* (2013.01); *H04L 65/1069* (2013.01); *H04L 65/4023* (2013.01); *H04M 3/5191* (2013.01); *H04N 7/141* (2013.01); *H04N 7/147* (2013.01); *H04N 7/155* (2013.01); *H04W 4/003* (2013.01); *H04W 4/206* (2013.01); *G06Q 50/01* (2013.01)

(58) Field of Classification Search
CPC combination set(s) only.
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Notice of Allowance for U.S. Appl. No. 14/039,689, mailed Sep. 4, 2015, 16 pages.

*Primary Examiner* — Joseph J Nguyen
(74) *Attorney, Agent, or Firm* — Blakely Sokoloff Taylor & Zafman LLP

(57) ABSTRACT

In accordance with disclosed embodiments, there are provided methods, systems, and apparatuses for implementing instant social image cobrowsing through the cloud, including, for example, means for loading an application at the client device, the application displaying a graphical interface at the client device; receiving input at the graphical interface of the client device to initiate an instant share session; generating an action at the client device to request an instant share session; communicating the action from the client device to a remote host organization via a public Internet; receiving, at the client device, a pointer to a dynamically created co-browse site at the host organization responsive to communicating the action from the client device to the remote host organization; following the pointer to the dynamically created co-browse site at the host organization communicably linking the client device with the host organization; and exchanging a video telephony stream between the client device and a remote party through the dynamically created co-browse site. Other related embodiments are disclosed.

20 Claims, 13 Drawing Sheets

(51) Int. Cl.
    *H04W 4/20*     (2009.01)
    *G06F 3/0484*     (2013.01)
    *G06F 3/0488*     (2013.01)
    *H04L 12/725*     (2013.01)
    *H04N 7/15*     (2006.01)
    *G06Q 50/00*     (2012.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0083195 A1 | 4/2004 | McCord et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0205626 A1 | 8/2008 | Mandalia et al. |
| 2009/0164645 A1 | 6/2009 | Sylvain |
| 2010/0266116 A1 | 10/2010 | Stolyar et al. |
| 2011/0161654 A1 | 6/2011 | Margolis et al. |
| 2012/0306993 A1 | 12/2012 | Sellers-Blais |

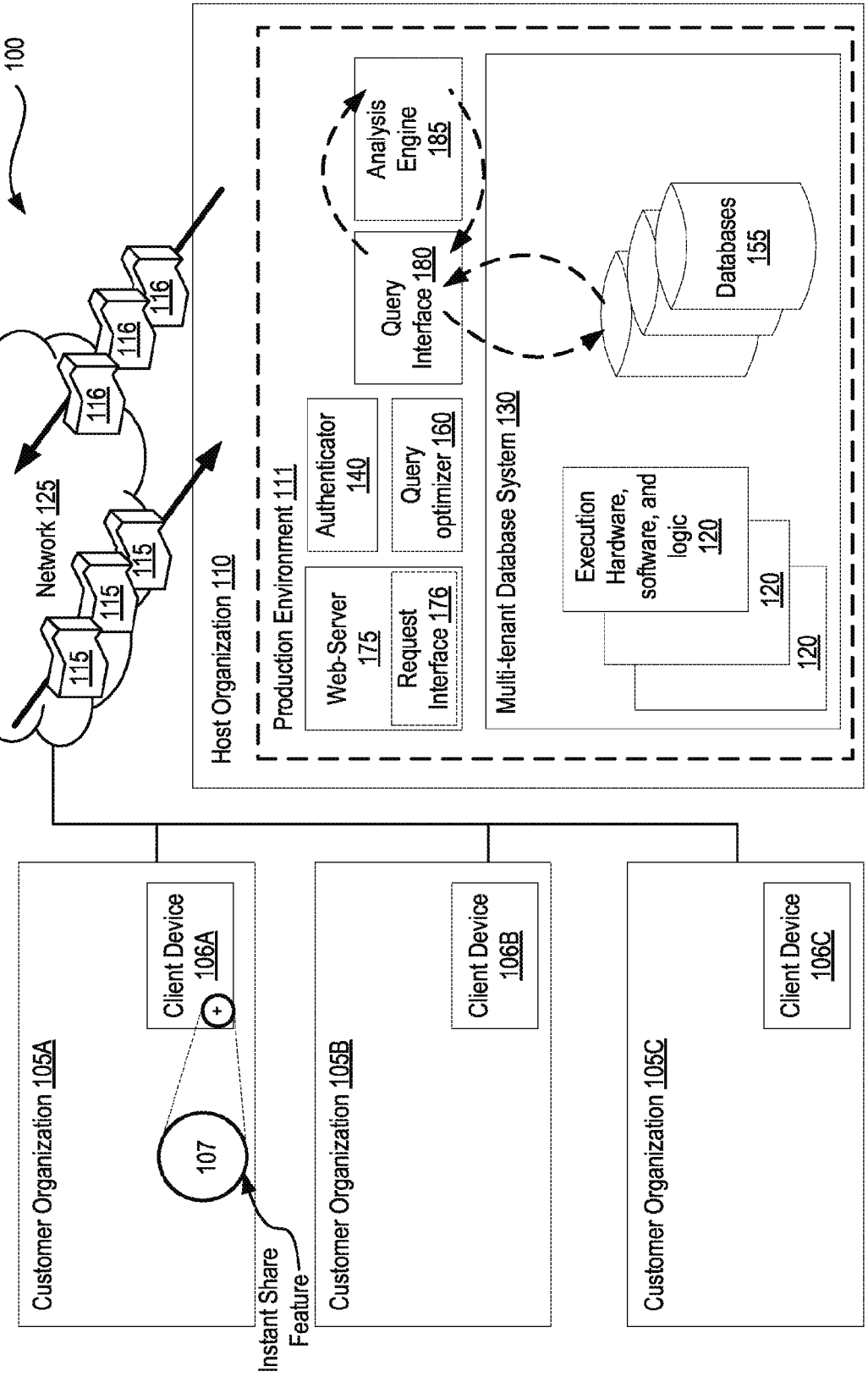

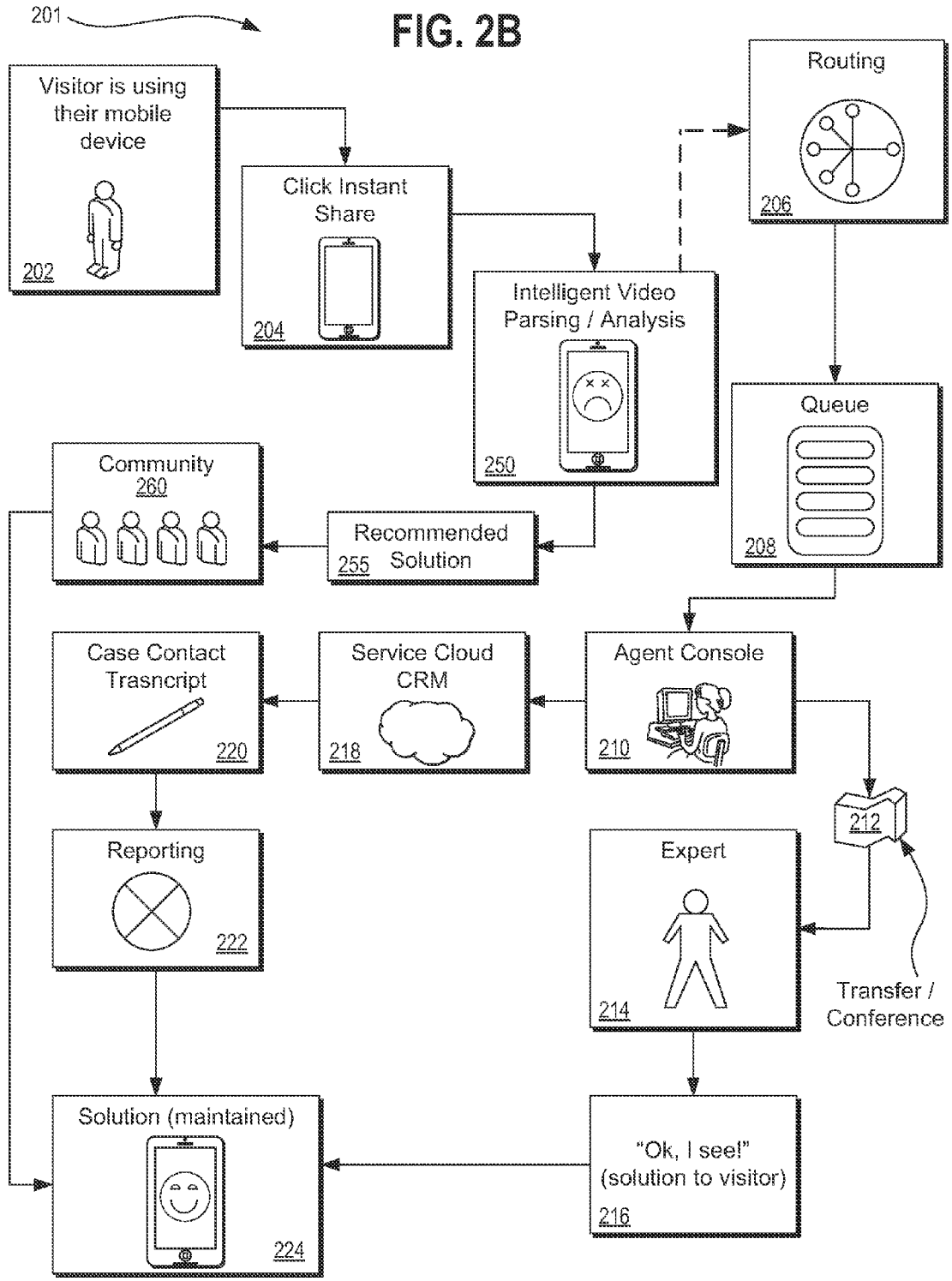

At a Client Device

At a Host Organization

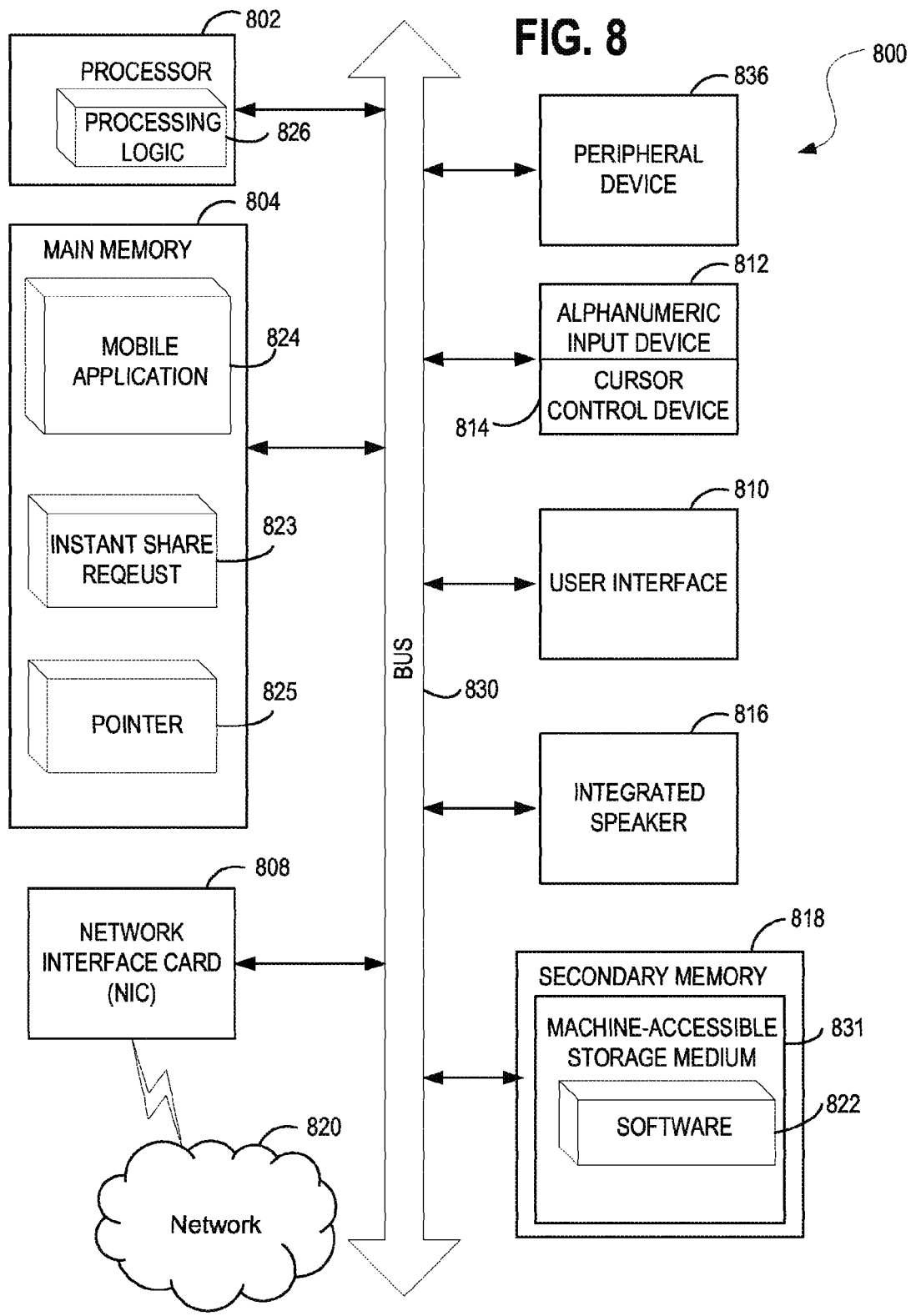

SYSTEMS AND METHODS FOR IMPLEMENTING INSTANT SOCIAL IMAGE COBROWSING THROUGH THE CLOUD

CLAIM OF PRIORITY

This divisional application is related to, and claims priority to, the utility application entitled "SYSTEMS AND METHODS FOR IMPLEMENTING INSTANT SOCIAL IMAGE COBROWSING THROUGH THE CLOUD," filed on Sep. 27, 2013, having an application Ser. No. 14/039,689, the entire contents of which are incorporated herein by reference; and is further related to, and claims priority to, the provisional utility application entitled "SYSTEM AND METHOD FOR INSTANT SOCIAL IMAGE COBROWSING," filed on Oct. 10, 2012, having an application No. 61/711,916, the entire contents of which are incorporated herein by reference; and is further related to the Utility application entitled "WEB CO-NAVIGATION," filed on Feb. 13, 2012, having an application Ser. No. 13/372,411, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing instant social image cobrowsing through the cloud.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Conventional solutions exist in the marketplace today for establishing communications between two parties, such as WebEx Communications Inc. as the provider of "WebEx," and also FaceTime by Apple Inc.

WebEx applications are built on the MediaTone platform intended to operate as a SaaS (Software as a Service) platform for online collaboration such as discussion forums, document sharing and calendaring, instant-messaging, and conferencing tools.

FaceTime provides videotelephony services for iOS and Macintosh computers. FaceTime is incompatible with non-Apple devices and is incompatible with any other video calling services. FaceTime provides videotelephony call initiation through integration with existing contacts within a contacts application installed concurrently on such devices and supports connections through WiFi and cellular networks (3G or LTE) subject to the carrier's discretion so long as the videotelephony call is placed to a phone number or email address that is registered to the FaceTime service. On iPad, iPod Touch, and Mac devices it is necessary to add a person as a contact using the FaceTime or Contacts app before the videotelephony call may be initiated.

The problem with such conventional solutions, both WebEx and FaceTime, is that a user is required to set up meeting number and ID in advance with a contact person that is already known and available within a contacts list or other such source. The pre-arrangement requirement creates additional steps and complexity in addition to consuming time and the requirement that a contact person already be known fully negates the feasibility of interacting with an unknown target contact. While such a feature may seem counter-intuitive it may nevertheless be beneficial to users within the certain contexts.

Further still, conventional solutions such as WebEx and FaceTime require additional routing by the user through an alternate communication means, typically this entails the user sending an invitation to another contact via email. Such a requirement again adds steps, complexity, and consumes time.

The present state of the art may therefore benefit from the systems, methods, and apparatuses for implementing instant social image cobrowsing through the cloud as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1 depicts an exemplary architecture in accordance with described embodiments;

FIG. 2B depicts an alternative block flow diagram in accordance with the embodiments;

FIG. 8 illustrates a diagrammatic representation of a machine in the exemplary form of a computer system, in accordance with one embodiment;

DETAILED DESCRIPTION

Figure 2A:
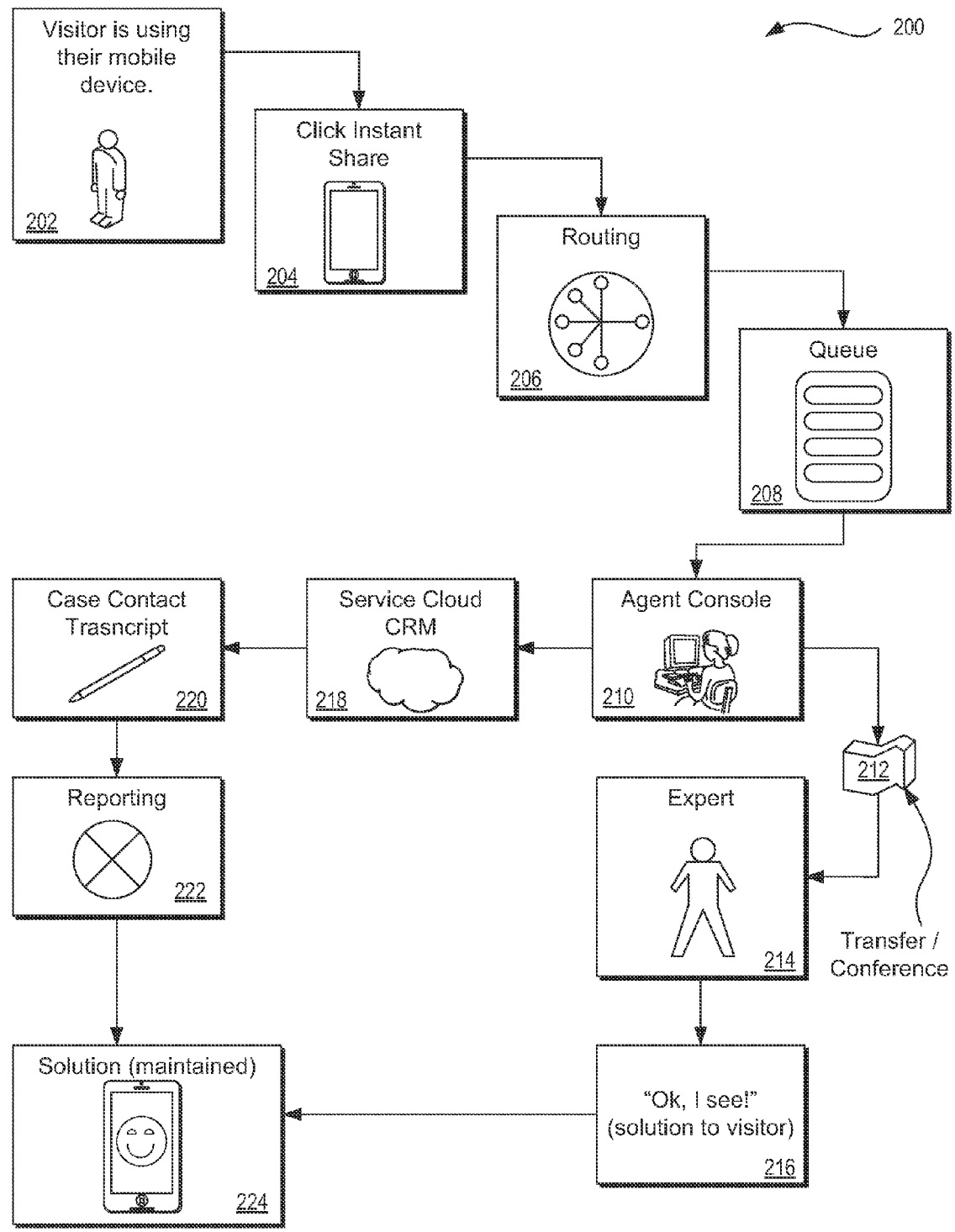
FIG. 2A depicts an exemplary block flow diagram in accordance with the embodiments.

Described herein are systems, methods, and apparatuses for implementing instant social image cobrowsing through the cloud, such as within an on-demand service environment or a host organization which provides cloud computing services to mobile computing devices.

According to certain embodiments there is a host organization which provides cloud computing services capable to support the instant social image cobrowsing methodologies which are described in detail herein in addition to providing cloud based database services via a single a multi-tenant database system which operates to store data on behalf of a multitude of paying subscribers, each being a "tenant" of the database system, hence the term multi-tenant database system. Many subscribers (e.g., users) utilize the multi-tenant database system to access stored data, analytics, charts, reports, GUIs, forms, executable user-supplied code and corresponding results/output, and other such services as provided via the Cloud by using the computing architecture of the host organization including the multi-tenant database system. The instant social image cobrowsing methodologies may further leverage the capabilities provided by the host organization and its multi-tenant database system but are not required to do so.

Such systems, devices, and methods may include, for example, means for: loading an application at the client device, the application displaying a graphical interface at the client device; receiving input at the graphical interface of the client device to initiate an instant share session; generating an action at the client device to request an instant share session; communicating the action from the client device to a remote host organization via a public Internet; receiving, at the client device, a pointer to a dynamically created co-browse site at the host organization responsive to communicating the action from the client device to the remote host organization; following the pointer to the dynamically created co-browse site at the host organization communicably linking the client device with the host organization; and exchanging a video telephony stream between the client device and a remote party through the dynamically created co-browse site.

Using conventional telephony solutions there is no means by which a user can establish an instant call, with only the click of a button or the selection of an "instant share" icon consistent with the methodologies which are described herein. Further still, users of conventional solutions must know in advance who they are connecting with, must have such a contact available within their contacts management application, they must know when they are connecting with such an individual, typically through manual coordination and exchanges via email, and then when they attempt to establish a telephony call, it is necessary for the other party being contacted to answer or accept the incoming connection or with certain technologies, it is necessary for the other party to also have called into a pre-arranged telephony conference venue.

While such a model is very familiar to users, it is nevertheless error prone, time consuming, and overly complex. Moreover, it fully negates any feasibility whatsoever for a user to establish a telephony session with an unknown target contact, much less establish such a session instantly.

Described herein are methodologies which disrupt these conventional norms and in doing so, simplify the usage model on behalf of users through the reduction of user-involved interactions which in turn reduces complexity, and additionally enable users to create telephony sessions with parties whom are not present within an existing contacts list, even unknown target parties that are unknown or unknowable to the user initiating the call, and still further yet, the users initiating such telephony sessions are enabled to create these telephony session instantly, including from mobile devices such as smart phones and tablets, etc.

Creating a telephony session with an unknown target party may on its face seem non-intuitive, however, in certain contexts it can be an extremely powerful feature provided to such users and allow businesses to yield greater value to their most important customers. Consider for example a business which provides technology solutions to users, say for example, a business that provides printers to business users. Such business users are financially speaking more lucrative, however, they also require specialized support in exchange for their business dollars. A business user may encounter a need for support, and faster, easier, and more seamlessly the business is able to yield support to that user, the better the user experience will be, which then in turn will translate to goodwill and likely improved business revenues.

Such a business user encountering a problem with their printer may very well be unaware of whom to call for support, certain will not have pre-arranged a time and meeting place to establish a telephony session, and may not even know how to proceed with reaching support.

However, using the described methodologies herein for implementing instant social image cobrowsing through the cloud, that same business can provide a simple mobile app to the user, who is then enabled to trigger an instant share session with appropriate support persons provided by the business. On the user's end, the user simply opens an app, and clicks an instant share icon, and from the user's perspective, they will be linked with a support person, depending upon routing rules, prioritization for that particular user, prioritization for that particular product or scenario, and so forth, each of which are configurable by the business.

Thus, for important clients, customers, users, products, and so forth, routing and prioritization may be configured such that a user is routed immediately to an available support person which can then engage with that important client or customer, and preserve or even improve the goodwill that exists between that particular client and customer.

In other embodiments users initiating a telephony session via an instant share feature of a supporting application may be routed differently. For example, some customers may be ineligible and thus routed to a free support community forum. Other users may be routed according to contractual Service Level Agreements (SLAs), for instance, they may have a tier 1 or "platinum" plan which gets them 24-hour instant service. Other customers at a lower tier may be routed with priority but subject to capacity of the greater tier customers and clients. Still other customers may have no plan whatsoever but may nevertheless be routed to a live agent pursuant to payment of a flat or time-based fee. Other users may be routed with priority given their association to a particular product, regardless of service plan. For instance, it may be that purchasers of a given class of printer, car, service, etc., are routed according to the businesses' determination of priority and importance to service those particular customers, etc. It is further feasible route certain customers with special dispatch and priority, based on their particular UserID, based on their importance to the business in terms of revenue, based on their position or role (e.g., high level executives may be given special dispatch over non-executives), and so forth, with such metrics being configurable by the business providing such support.

In certain embodiments, a user initiating the instant share feature will be routed into a designated pool of support persons. In other situations, the user may be contextually routed based on their affiliation to products, services, service tiers, and so forth. For instance, where a user purchased the aforementioned printer and this context information is known, the user may be routed to an appropriate expert having knowledge as to that particular printer, rather than requiring the user to provide such information verbally. In other embodiments, users may be routed into a pool first and then escalated according to various criteria via a queue or escalation path based on, for example, time thresholds, priority of the user or affiliation with given products, and so forth.

More than the ability to create the telephony session via the instant share feature, the user is further enabled to engage with the party via the telephony services, such as the expert or support person in a more intuitive manner through the peripheral capabilities of their computing device. For instance, using a smart phone, tablet, or other mobile computing device, the user is able to point their device camera at a the problem, for instance, pointing the phone at the broken printer, etc., and allowing the support person or expert to see in real time, the nature and details of the problem from status light indicators, error messages, misconfigured cabling, and so forth. Further still, the user and the support person or expert may engage in discourse regarding the particular issue to be solved and further have a face to face telephony exchange through the respective cameras and displays of each parties computing device, be it a smart phone, tablet, PC, Kiosk, or other appropriate device given the context of the user's request and the products and services being provided.

Another example may be that of tech support with an Internet Services Provider whom, rather than making inquires to the user as to the status of LED lights on a router, modem, or Fiber/Ethernet interface, the user may initiate an instant share session as described and then at the request of the expert or support person, the user may simply aim their device's camera toward the appropriate component, be it their router, modem, or Fiber/Ethernet interface, PC, laptop, or whatever device is involved in the diagnosis. One could readily see such capabilities being utilized in many other support environments, such as a lay person calling for emergency 911 type services, calling poison control, calling for fire, police, ambulance, or that of a medical technician consulting with a doctor, either as the originator or the expert servicer, that of a patient seeking help from a nurse, and so forth, any of which would benefit from the instant share feature capabilities along with the audio and video telephony services which are then further enabled and integrated by using the instant share feature on appropriate devices, which are many given the ubiquity of mobile devices with audio video input/output capabilities in modern times.

In certain embodiments, a host organization provides a mobile app to such a business for configuration and re-deployment with the businesses' own branding, settings, configurations, escalation paths, priority routing rules, support pools and experts, and so forth. For instance, such a host organization may provide an Android platform app, an iOS platform app, or a Windows mobile platform app for configuration and branding by another third party which then re-deploys such an app to its end users.

In one embodiment an end user having installed such an app on a mobile device, such as a smartphone or tablet, initiates an instant share feature by opening the app provided to them and then clicking an instant share icon. Upon doing so, the user is then connected to an expert or other support person in the manner described in further detail below, subsequent to which, the end user may then view the support person or expert on the screen of the end-user's mobile device, view other multi-media on the screen of the end-user's mobile device, speak with the expert or support person through an audio microphone of the end-user's mobile device, convey the end user's image to the support person or expert via the camera of the end-user's mobile device, and convey products, error messages, cables, or other video and images to the support person or expert via the camera of the end-user's mobile device. Similarly, the support person or expert may convey their likeness to the end user for display via the screen of the end-user's mobile device, and speak with the end user by transmitting to the audio device or speaker of the end-user's mobile device. In other embodiments, the methodologies described herein for implementing instant social image cobrowsing through the cloud may be provided by a third party without the aid of such a host organization which provides other on-demand cloud based services.

These and other details are described in further detail in the context of the individual figures.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. Depicted at client device 106A is the instant share feature 107, for instance, embodied within a mobile app or other supporting application at a client device 106A-C.

In one embodiment, a multi-tenant database system 130 includes databases 155, for example, to store information such as tables, datasets, and underlying database records with user data on behalf of customer organizations 105A-C or client devices 106A-C. The host organization 110, its production environment 111, and its multi-tenant database 130 may operate cooperatively on behalf such client devices 106A-C and their users to implement and utilize the instant sharing feature, including, for example, providing for routing paths, escalations, prioritization rules, service level agreement contractual adherence, correct observance of priority, escalation, and routing according to paid service tiers or products, intelligent video parsing, analysis, support of user community forums including auto publishing of recommended solutions to such communities, queuing, reporting, expert location services, attendee invites, dynamic generation of co-browsing sites including passing links and enabling the following of such links, etc. Such services will be described in additional detail below.

According to the embodiment depicted at FIG. 1, the multi-tenant database system 130 includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services, or cloud computing services to subscribing customer organizations 105A-C.

Host organization 110 may receive input and other requests 115 from a plurality of customer organizations 105A-C via network 125 (such as a public Internet). For example, incoming instant share session initiation requests generated by a mobile app executing the client devices 106A-C may be communicated to the host organization 110 via the Public Internet or other network 125. Further still, database queries, API requests, interactions with displayed graphical user interfaces and displays at the client devices 106A-C, or other inputs may be received from the customer organizations 105A-C to be processed against the multi-tenant database system 130 or processed using the computing architecture of the host organization 110 and its production environment 111.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130 via the web-server 175 or other receive and request interface such as that depicted at element 176. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. In other embodiments, the requests 115 receive are processed according to their context. For instance, instant share feature requests from a mobile app may be serviced on the basis that the request 115 is being sent pursuant to a user clicking on an instant share icon.

Web-server 175 may be responsible for receiving requests 115 from various customer organizations 105A-C via network 125 and provide a web-based interface or other graphical displays to an end-user client device 106A-C or machine originating such data requests 115. For instance, the instant share feature may be provided as a plug-in component to a mobile app, may be provided as HTML5 or other web-based display technology to a mobile device such as the client devices 106A-C, and so forth.

Authenticator 140 operates on behalf of the host organization to verify, authenticate, and otherwise credential users attempting to gain access to the host organization.

Query interface 180 provides functionality to pass queries from web-server 175 into the multi-tenant database system 130 for execution against the databases 155 or other data stores of the host organization's production environment 111 where necessary and appropriate. For instance, routing rules, policies, escalation path information may be stored within the databases 155 and are customizable on a per-user, per-product, or per-customer organization basis, causing the host organization therefore to pull such information from the databases 155 when needed. In one embodiment, the query interface 180 implements an Application Programming Interface (API) through which queries may be executed against the databases 155 or other data stores. Query optimizer 160 performs query translation and optimization, for instance, on behalf of other functionality such as functionality of a graphical interface which possesses sufficient information to architect a query yet lacks the necessary logic to actually construct the appropriate query syntax. In other instances, query optimizer 160 modifies a submitted query to optimize its execution within the host organization without affecting the resulting dataset returned responsive to such an optimized query. Analysis engine 185 operates on behalf of functionality within the host organization to perform additional data evaluation where necessary, such as evaluating incoming requests from an instant share session initiation request for relevant context, userID, customer OrgID, product associations, SLAs, pricing tiers, and so forth. In other instances, logic associated with the relevant displays at the client devices 106A-C performs analysis or may cooperatively perform the analysis with the host organization 110 or other cloud based services provider responsible for supporting use of the instant share feature.

Request interface 176 further supports the return of response packets or other replies and responses 116 in an outgoing direction from host organization 110 to the client devices 106A-C.

FIG. 2A depicts an exemplary block flow 200 diagram in accordance with the embodiments. More particularly, there is depicted a series of interactions which cause the use of an instant sharing feature to be implemented. Beginning with block 202 a site visitor (e.g., user) is using their mobile device and at block 204, the visitor clicks instant share at the mobile device (e.g., opens a supporting app and clicks an instant share icon within the app). Pursuant to the visitor clicking instant share the visitor's action causes an instant share request to be initiated and communicated from the visitor's mobile device to a supporting host organization for routing as depicted at 206. The visitor's instant share request then passes through queue 208 and on to agent console 210 from which either of two paths, or both paths may be followed.

From the agent console at block 210 the visitor's instant share request may be transferred to or conferenced with a relevant expert 214 as depicted by the passing of message 212. The expert 214 aids the visitor having originally initiated the instant share request and at block 216 an appropriate solution is provided to the visitor, here indicating, "Oh I see!" responsive to the aid provided by the expert 214. The solution is then maintained for future use as depicted by block 224.

Returning to agent console 210, the alternate path may be taken in addition to the path through expert 214 or may be taken alternative to the path through expert 214 depending on routing rules, priority for the visitor, product affiliation, escalation paths, and so forth. Regardless, the alternative path from agent console 210 advances through the service cloud CRM ("Customer Relationship Management") at block 218 subsequent to which a case contact transcript 220 is generated and maintained based on documented cases, problems, solutions, and other resources available through service cloud CRM 218. Reporting at block 222 documents the problem and solution and the solution is maintained as before as depicted at block 224.

FIG. 2B depicts an alternative block flow 201 diagram in accordance with the embodiments. More particularly, the alternative block flow 201 of FIG. 2B is similar to that of FIG. 2A except that addition details are depicted and additional parsing, analysis, and auto recommendation means are employed.

Beginning with block 202 as before, a site visitor (e.g., user) is using their mobile device and at block 204, the visitor clicks instant share at the mobile device but prior to advancing to routing at block 206, the visitor's instant share request may be processed through intelligent video parsing and analysis at block 250 which analyzes the video telephony stream from the visitor to determine if a recommended solution at block 255 may be automatically recommended without advancing the visitor through to routing at block 206, queuing at block 208, and on to the agent console at block 210 as in the example depicted at FIG. 2A.

If the recommended solution at block 255 is identified and automatically presented to the visitor (e.g., by return display to the visitor's mobile device) then it may be wholly unnecessary to engage the agent console at block 210 or the expert 214 via transfer to or conference with as depicted by the message 212 being passed to the expert 214.

Moreover, in such an embodiment where the intelligent video parsing and analysis at block 250 results in the recommended solution 255 being identified and auto presented to the visitor then processing may advance such that the recommended solution 255 for the analyzed problem identified by the intelligent video parsing and analysis at block 250 is posted or published to relevant community 260 forum and support boards. In certain embodiments, the posting or publishing to relevant community 260 forum and support boards is a wholly automated process when the recommended solution 255 is identified by the intelligent video parsing and analysis of block 250.

Processing then advances to block 224 where the recommended solution from block 255 is maintained as the solution to the problem at block 224.

If the intelligent video parsing and analysis at block 250 fails to result in the recommended solution 255 being identified and auto presented to the visitor then processing may advance as in FIG. 2A with processing proceeding from the agent console at block 210 to be transferred to or conferenced with a relevant expert 214 which aids the visitor until an appropriate solution is provided to the visitor at block 216, pursuant to which the solution is then maintained for future use as depicted by block 224 or as before, processing may proceed through the service cloud CRM at block 218, through case contact transcript at block 220, to reporting at block 222, and then to block 224 where the identified solution is maintained.

It is also possible for the visitor's routing 206 to cause them to pass to the agent console at block 210 and through either or both of the expert 214 via an escalation path or other routing priorities or through the service cloud CRM at block 218, or both, while concurrently permitting the intelligent video parsing and analysis at block 250 to identify the recommended solution 255 and proceed with posting or publishing the recommended solution 255 to the relevant community 260 forum and support boards for the benefit of other visitors but not necessarily to be shared with or pushed to the visitor having originally initiated this particular instant share feature request at block 204. For instance, the visitor's instant share feature request at block 204 may be processed through the agent console 210 and potentially expert 214 without negating the capability of the host organization processing and analyzing such video information at block 250 for future needs.

Figure 3:
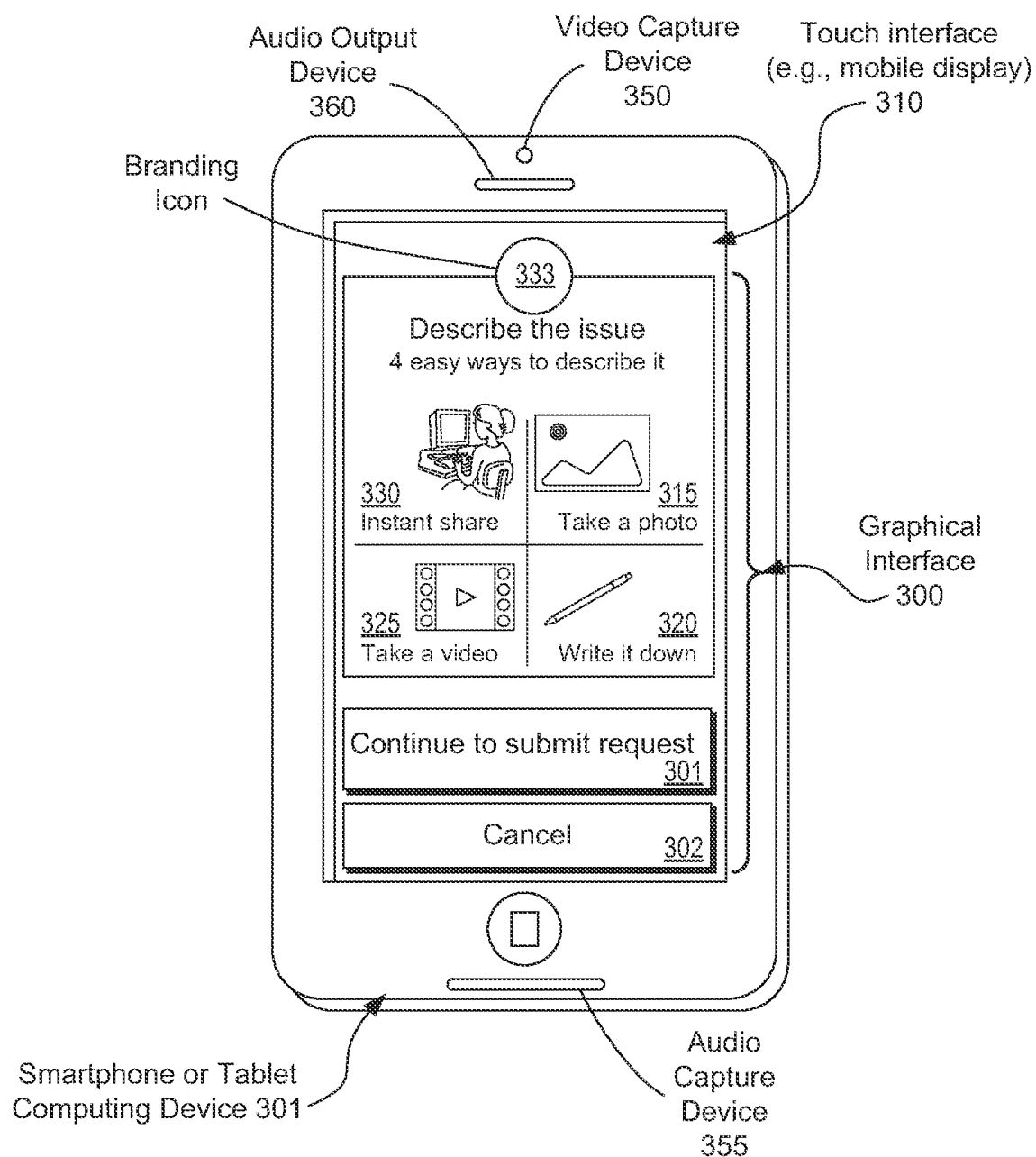
FIG. 3 depicts an exemplary graphical interface operating at a mobile, smartphone, or tablet computing device in accordance with the embodiments.

FIG. 3 depicts an exemplary graphical interface 300 operating at a mobile, smartphone, or tablet computing device 301 in accordance with the embodiments. More particularly, a client device such as those depicted at FIG. 1, element 106A-C is depicted here embodied within the form factor of a mobile device and specifically as a smartphone, or tablet computing device 301 having operating thereupon the graphical interface 300. The smartphone, or tablet computing device 301 further includes an audio capture device 355, such as an audio microphone, to capture a user's voice, speech, and other ambient sounds within the environment, an audio output device 360, such as an audio speaker, to output audible sound, speech, and other audio communicated from, for example, an expert or support person with whom the user may be connected via the instant share feature described. The smartphone, or tablet computing device 301 still further includes a video capture device 350, such as a phone camera, to capture video and other images from the perspective of the user's mobile device. Many smartphone, or tablet computing devices 301 have two such video capture devices 350, often one configured in a forward facing and a rear facing orientation, respectively. The smartphone, or tablet computing device 301 still further includes a touch interface 310, such as a mobile display or other video output device capable of displaying and rendering moving and still video images from, for example, an expert or support person with whom the user may be connected via the instant share feature described.

Within the graphical interface 300 depicted here upon the smartphone, or tablet computing device 301 are several icons and actions, including a branding icon 333 upon which a business or other entity may customize their mobile application displayed at such a smartphone, or tablet computing device 301 with their own particular brand or other imagery, a submit action 301 permitting a user to proceed with submitting a request to a host organization, expert, support person, or other such party, a cancel action 302 for use by a user should the user wish to cancel or terminate an event or submission without communicating the same to a host organization, expert, support person, or other such party, and then several submission icon types including an instant share icon 330, a photo submission icon 315, a video submission icon 325, and a text submission icon 320.

Depending on how the user wishes to proceed, the user may snap a photo of a problem for submission and then proceed with communicating the photo via the photo submission icon 315; the user may record video of a problem for submission and then proceed with communicating the video via the video submission icon 325; the user may create a text based message describing a problem for submission and then proceed with communicating the text based message via the text submission icon 320, or the user may initiate an instant share request for support by clicking on the instant share icon 330 which then triggers the processing as is described herein such that a user associated with appropriate priority rules, escalation procedures, product affiliation, service tier level, or other appropriate criteria is matched real-time with a support person or qualified expert who may then assist the user by engaging with them through the smartphone, or tablet computing device 301 and its peripherals to display, record, render, and capture audio, video, and so forth.

In certain embodiments, each of the various icons described are provided as pluggable components by a host organization and are linked with the appropriate functionality to carry out the methodologies as described, and a third party simply selects the icons they wish for inclusion with a mobile app for deployment to the third party's customers or user base along with appropriate branding where desired via branding icon 333 and appropriate configuration of the appropriate priority rules, escalation procedures, product affiliation, service tier level, or other appropriate criteria for their given users to facilitate escalation and matching of users to experts or support persons in the manner which best fits the needs of the third party's business.

Figure 4:
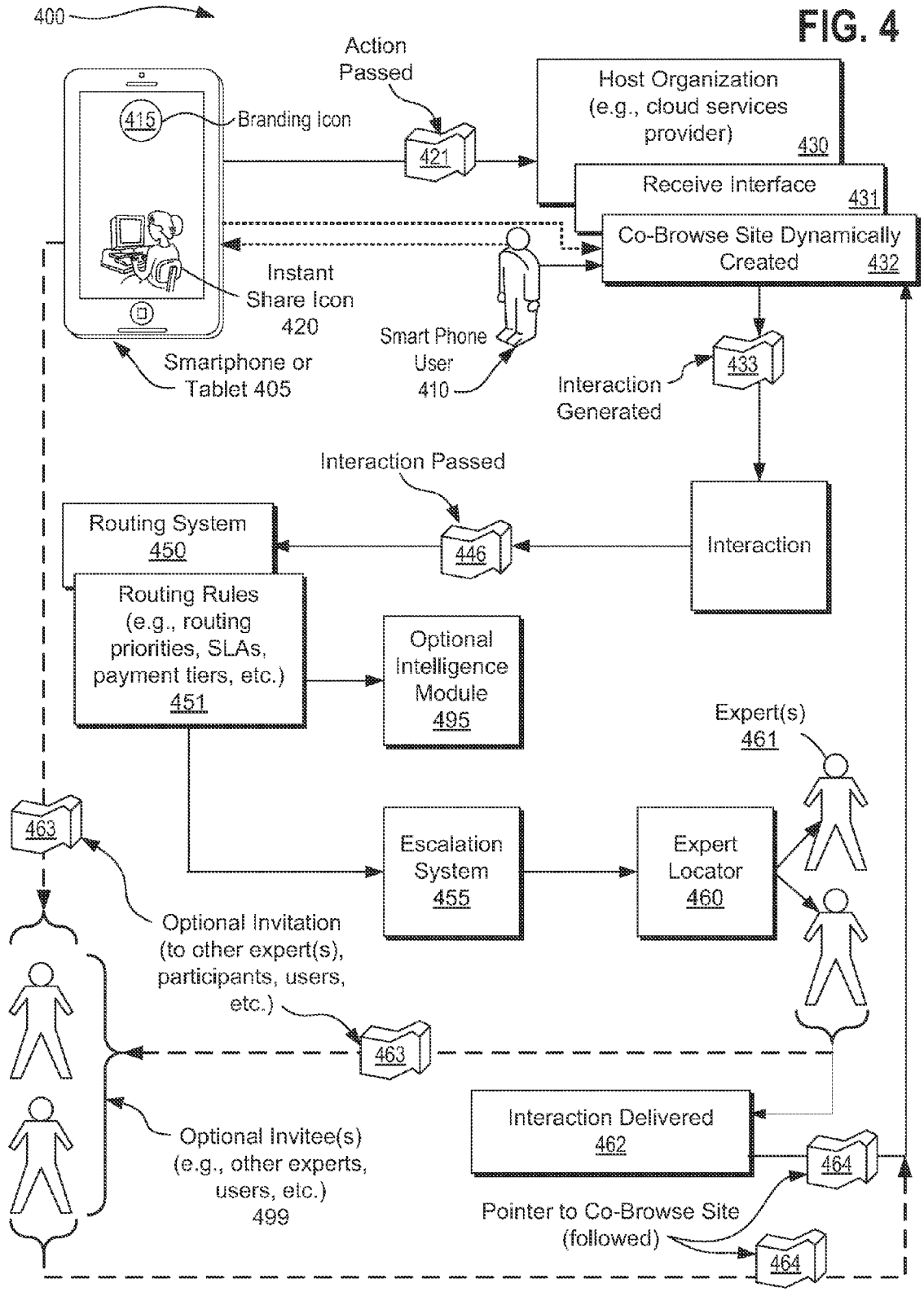
FIG. 4 depicts another alternative block flow diagram in accordance with the embodiments.

FIG. 4 depicts another alternative block flow 400 diagram in accordance with the embodiments. More particularly, depicted here are the operations that are triggered and processed upon a user's initiating the instant share feature by, for example pressing the instant share icon 330 as depicted at FIG. 3 and depicted again here via the instant share icon at element 420.

Thus, beginning with the smartphone or tablet 405 mobile computing device having executing thereupon a mobile app with the instant share icon 420, and optionally the branding icon 415 for customizing the mobile app, a smartphone user 410 presses, touches, selects, clicks, or otherwise activates the instant share icon 420 which initiates the instant share feature request by causing an action 421 to be generated and passed from the smartphone or tablet 405 mobile computing device to the host organization 430, such as a cloud services provider described previously with regard to FIG. 1 at element 110. The host organization 430 receives the action passed 421 via receive interface 431 which is outward facing to the network, such as a public Internet and configured to receive these and other incoming messages and requests, responsive to which the host organization 430 will trigger a co-browse site to be dynamically created 432 or generated in support specifically of this smart phone user 410 depicted for this particular action passed 421. Subsequent or additional instantiations of the instant share feature request by this smart phone user 410 or other users would trigger the creation at the host organization of a different dynamically created co-browse site.

The smart phone user's 410 smartphone or tablet 405 mobile computing device is then linked or communicably interfaced with the co-browse site dynamically created 432 by and at the host organization 430 as is depicted by the dotted arrowed line between the smart phone user's 410 smartphone or tablet 405 mobile computing device and the co-browse site dynamically created 432. The host organization 430 generates interaction 433 along with the dynamic creation of the co-browse site on behalf of the smart phone user's 410 instant share feature request instantiation and the interaction is then passed 446 to the routing system 450 as indicated by the forwarding arrows.

At the routing system 450, the aforementioned routing rules (e.g., routing priorities, SLAs, payment tiers product affiliations, user classifications, escalation rules, and any other relevant criteria) are applied to the incoming interaction passed 446 such that the host organization 430 may make the appropriate processing determinations to route and otherwise service the smart phone user's 410 instant share feature request. For instance, as detailed at each of FIGS. 2A and 2B, the user may be placed through to a support person at an agent console (element 210), routed to an identified expert (element 214), or processed through the service cloud CRM (element 218) and/or relevant support community (element 260), etc. The optional intelligence module 495 is shown linked here which may perform the intelligent video parsing and analysis as described previously, for instance, to capture and document the problem for others within the service cloud CRM (element 218) and/or relevant support community (element 260), as well as to provide an auto recommendation to the smart phone user 410 where such a solution is identifiable via the video parsing and analysis and when the routing rules 451 are so configured.

Where the routing rules 451 permit the smart phone user 410 to advance to a support person or expert, the interaction passed 446 is then advanced through to the escalation system 455 along what is referred to as an escalation path. Here, the host organization 430 may apply an automated expert locator 460 as depicted which is capable of then routing the interaction along to an appropriately identified expert or experts 461, or the processing may be handled at this stage by an agent console as was depicted in the context of FIGS. 2A and 2B at element 210.

Having the smart phone user 410 now paired or matched with the relevant expert(s) 461, the interaction is delivered 462 to the expert(s) 461 which provides the expert(s) 461 with a pointer to the dynamically generated co-browse site. The pointer to the co-browse site 464 is then followed causing the expert(s) 461 to then be linked or communicably interfaced with the co-browse site dynamically created 432 by the host organization 430 in the same manner as was the smart phone user's 410 smartphone or tablet 405 mobile computing device. More particularly, both the smart phone user 410 and the expert(s) 461 are now connected in common to the co-browse site dynamically created 432 by the host organization 430 such that each may converse, interact, speak with one another via telephony services, share documents, images, video, audio, and so forth, as enabled by the instant share feature initiated by the user and without the user knowing in advance who the expert(s) 461 are, without having the expert(s) 461 incorporated into a contacts manager of the smart phone user's 410 smartphone or tablet 405 mobile computing device, without the smart phone user 410 having pre-arranged any meeting time or meeting place with the expert(s) 461, and without any external manual coordination by the smart phone user 410 with the expert(s) 461 as to a meeting place, time, venue, technology, protocol, etc., thus resulting in a simple user experience.

Processing may end here, where the smart phone user 410 reaches a satisfactory solution with the selected expert(s) 461. However, additional optional processing is further enabled. For instance, either the smart phone user 410 or the expert(s) initially selected, or both, may invite other expert(s), participants, users, and so forth to participate in the now active instant share session at the co-browse site dynamically created 432 by the host organization 430 such that all such parties may converse, interact, speak with one another via telephony services, share documents, images, video, audio, and so forth.

Specifically, the expert(s) 461 may pass an optional invitation 463 to other such experts, participants, users, and so forth as depicted by the hashed line directed toward the optional invitee(s) at element 499 and/or the smart phone user 410 may in a similar fashion pass an optional invitation 463 to other such experts, participants, users, and so forth as depicted by the hashed line directed toward the optional invitee(s) at element 499. If the optional invitee(s) 499 accept, then they may follow the pointer to the co-browse site 464 as did the initially selected expert(s) 461 in the manner described above, resulting in the optional invitee(s) 499 now also being linked or communicably interfaced with the co-browse site dynamically created 432 by the host organization 430.

In such a way, upon the smart phone user 410 pressing the instant share icon, the relevant interaction is routed through the escalation queue or path and through expert location services where an expert accepts the interaction and then in real-time the smart phone user 410 is interfaced to the expert without the smart phone user 410 having to take any additional action whatsoever as the host organization applies the appropriate routing, queuing, selecting, prioritization and routing rules, and so forth on behalf of the smart phone user making the instant share feature request.

At the co-browse site dynamically created 432 by the host organization 430 an auto built site is provided to host and deliver audio video telephony streams incoming and outgoing from the smart phone user, the experts, and any optional invitees, without the parties having to manually configure or pre-arrange such telephony services. Any party having been given the interaction and the link back to the co-browse site dynamically created 432 may then participate within a common venue in real time, whether their participation is viewing, listening, speaking, broadcasting audio and/or video, sharing documents, etc.

In certain embodiments, a user may utilize their smartphone or tablet 405 mobile computing device as described but then additionally link into the co-browse site dynamically created 432 with another PC, laptop computer, second mobile device, or other multimedia device simply by providing the optional invitation 463 to the relevant device or user. For example, video of the expert 461 could be displayed on a laptop screen while simultaneously video of the smartphone or tablet 405 mobile computing device's camera may be displayed via the touch screen display of the smartphone or tablet 405 mobile computing device, thus enabling the user to use to distinct screens for two different feeds traversing the same instant share feature session through the co-browse site dynamically created 432.

In certain embodiments, an initially selected expert 461 pursuant to expert locator 460 may again escalate a smart phone user 410 to a different expert rather than inviting additional experts.

In certain embodiments, HTML5 compliant display logic is utilized and the instant share icon is presented via an HTML5 compliant website or mobile app, whereas in other embodiments, such as those deployed exclusively via mobile apps, native code may be used, and in still others, a hybrid of HTML5 compliant display logic and native display logic may be utilized.

In certain embodiments social network components are integrated such that a smart phone user 410 may invite friends as the optional invitee(s) 499 to participate real-time in the instant share feature session with the selected expert(s) 461. In certain embodiments, a user may select such friends to be invited through friend's contacts within a social network application co-installed on the smartphone or tablet 405 mobile computing device.

In certain embodiments where the optional intelligence module 495 parses and analyzes video associated with the instant share feature session between the expert(s) 461 and the smart phone user 410, a recommended solution as described previously may be posted or published to relevant communities, however, an optional invitation 463 may additionally be posted or published to the relevant support communities thus allowing forum and community users to follow a pointer to the co-browse site and either participate or simply observe the instant share feature session in progress between the expert(s) 461 and the smart phone user 410. For example, the optional intelligence module 495 may apply intelligence on the fly for parsing and analyzing video streams associated with the instant share feature session in progress and then match the video to contextually relevant portions of the community site or forum by pushing a recommended solution to the site and potentially pushing the optional invitation 463 out to the site.

In the described embodiments, co-browse technologies allow for easy, zero footprint, website screen sharing and facilitate instant share feature sessions including video telephony services in the manner described. Telephony and video teleconferencing technology may involve initiating a "call" that is handled and routed by the host organization 430 for connecting people together in a shared video environment, be they users triggering the instant share feature request, initially selected support persons and experts, optional invitees, forum participants, social network friends, other experts selected by the initial experts, and so forth. In one implementation, aspects of co-browse technology may be combined with video capture technology (or in low bandwidth situations, image capture). Additional features, methods and systems can then be provided so consumers have the ability to set up a "you see what I see" environment.

For instance, when an instant share icon or button is pressed, a co-browse "meet me" site is built dynamically by and at the host organization 430 and then the consumer is prompted to invite others to share their view, if desired. The view may then be fed to Chatter™ Facebook, Twitter, or other designated social network lists where select people would receive "instant invitations" to share the view at the dynamically built site. Such a view may be a video troubleshooting session, a restaurant menu, or just a "help me find my way, I'm lost" type session.

In certain embodiments, anybody can view the user's co-browse view as long as they had the view code and were invited, typically passed via optional invitations 463. In one implementation, the view is captured by a real-time recording capability for playback later. In a low bandwidth situation, consumers may simply take pictures that are automatically uploaded to the co-browse portal to constitute the view from the low bandwidth device.

In related embodiments, video streams generated by users having initiated the instant share feature are recorded and shared with, pushed to, or published via a sharing site, such as a community forum, from where other members of the forum community may then view the video stream themselves, and otherwise control the video stream by pausing, re-winding, fast forwarding, playing, and re-playing the video stream at their own local display, even while the original video stream is on-going between the user having initiated the instant share feature and the support person or expert. For instance, a second user at a second computing device may wish to view and review the video stream for themselves, despite not being a direct participant, and such a user may do so even while the participants of the stream continue to engage via a video telephony stream between them as enabled through the dynamically created co-browse site at the host organization. Such a second user is enabled to manipulate the recorded video stream by pausing, rewinding, playing, fast-forwarding, etc., from the beginning of such a stream all the way up to and until the live as it happens portion of the video telephony stream being recorded. Thus, the second computing device could fast forward until both a viewer at a second device and the participants of the video telephony stream are all at a concurrent position, that is, all parties are viewing the live stream as it happens.

There is according to a particular embodiment, a method for instant social image cobrowsing, in which the method includes at least: providing dynamic and real-time cobrowsing to users in a mobile environment; and providing video capture ability to users in the mobile environment.

Figure 5:
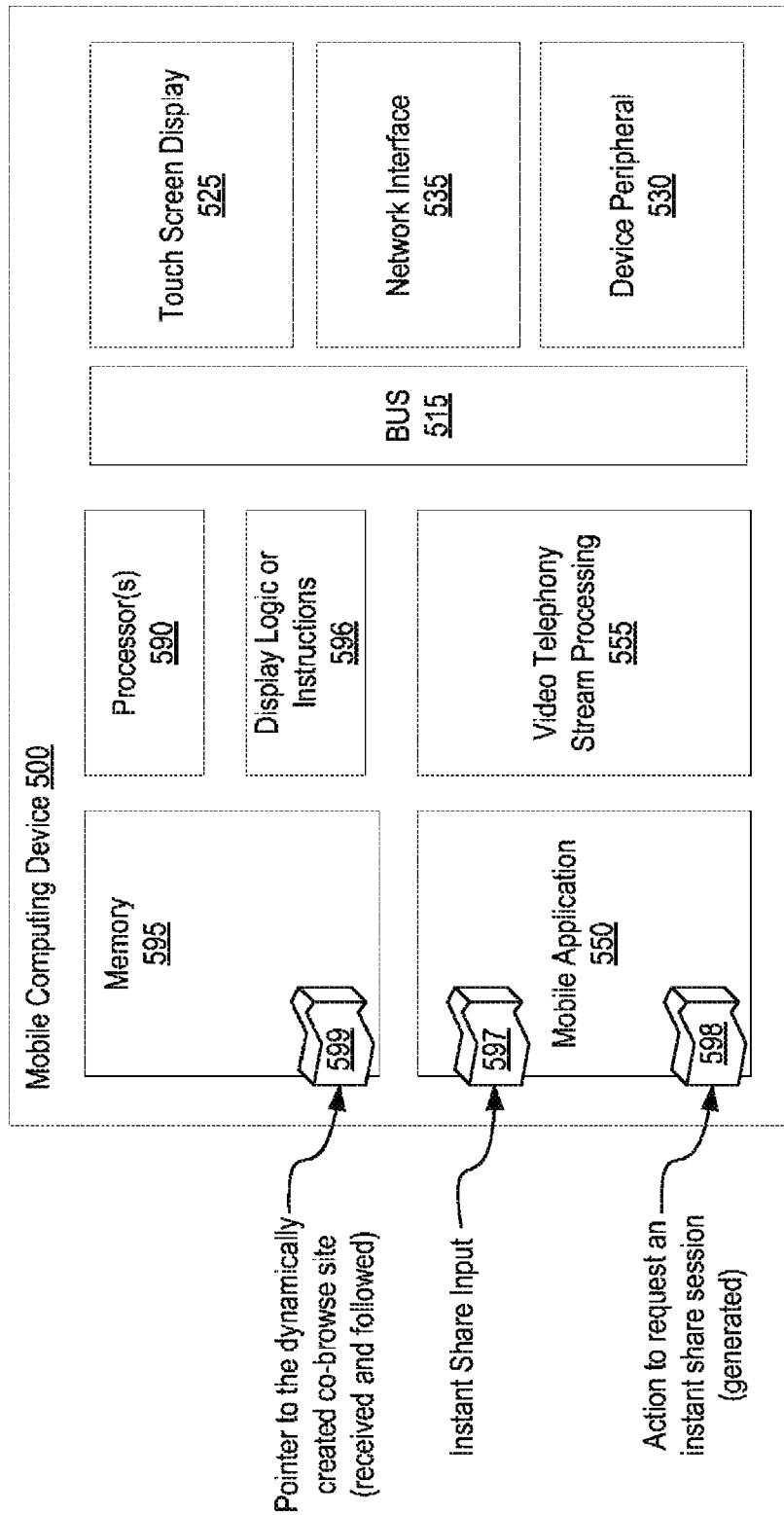
FIG. 5 shows a diagrammatic representation of a system in accordance with which embodiments may operate, be installed, integrated, or configured.

There is according to another embodiment, a system for instant social image cobrowsing, the system having therein at least: a processor; code stored in memory coupled to the processor; in which, the code, when executed via the processor: provides dynamic and real-time cobrowsing to users in a mobile environment and further provides video capture ability to users in the mobile environment FIG. 5 shows a diagrammatic representation of a mobile computing device 500 in which embodiments may operate, be installed, integrated, or configured.

In accordance with one embodiment, there is a mobile computing device 500 having at least a processor 590 and a memory 595 there to execute display logic and/or instructions 596. According to such an embodiment, the mobile computing device 500 further includes a touchscreen display 525 to display or render a graphical interface at the mobile computing device 500; in which the processor is to load a mobile application 550 at the mobile computing device 500, such that the mobile application 550 displays a graphical interface at the mobile computing device; the touchscreen 525 of the mobile computing device is to receive input 597 to initiate an instant share session; the mobile application 550 is to generate an action 598 at the mobile computing device 500 to request an instant share session; a network interface 535 is to communicate the action 598 from the mobile computing device 500 to a remote host organization via a public Internet; the network interface 535 is to receive a pointer 599 to a dynamically created co-browse site at the host organization responsive to communicating the action 598 from the client device 500 to the remote host organization; the mobile application 550 is to follow the pointer 599 to the dynamically created co-browse site at the host organization communicably linking the client device 500 with the host organization via the network interface 535; and in which the mobile application 550 is to exchange a video telephony stream between the client device and a remote party through the dynamically created co-browse site. In one embodiment, the video telephony stream is exchanged via a video telephony stream processing 555 module at the mobile computing device 500.

Bus 515 interfaces the various components of the mobile computing device 500 amongst each other, with the remote host organization via the network interface 535, and with any other peripheral(s) 530 of the mobile computing device 500.

Figure 9A:
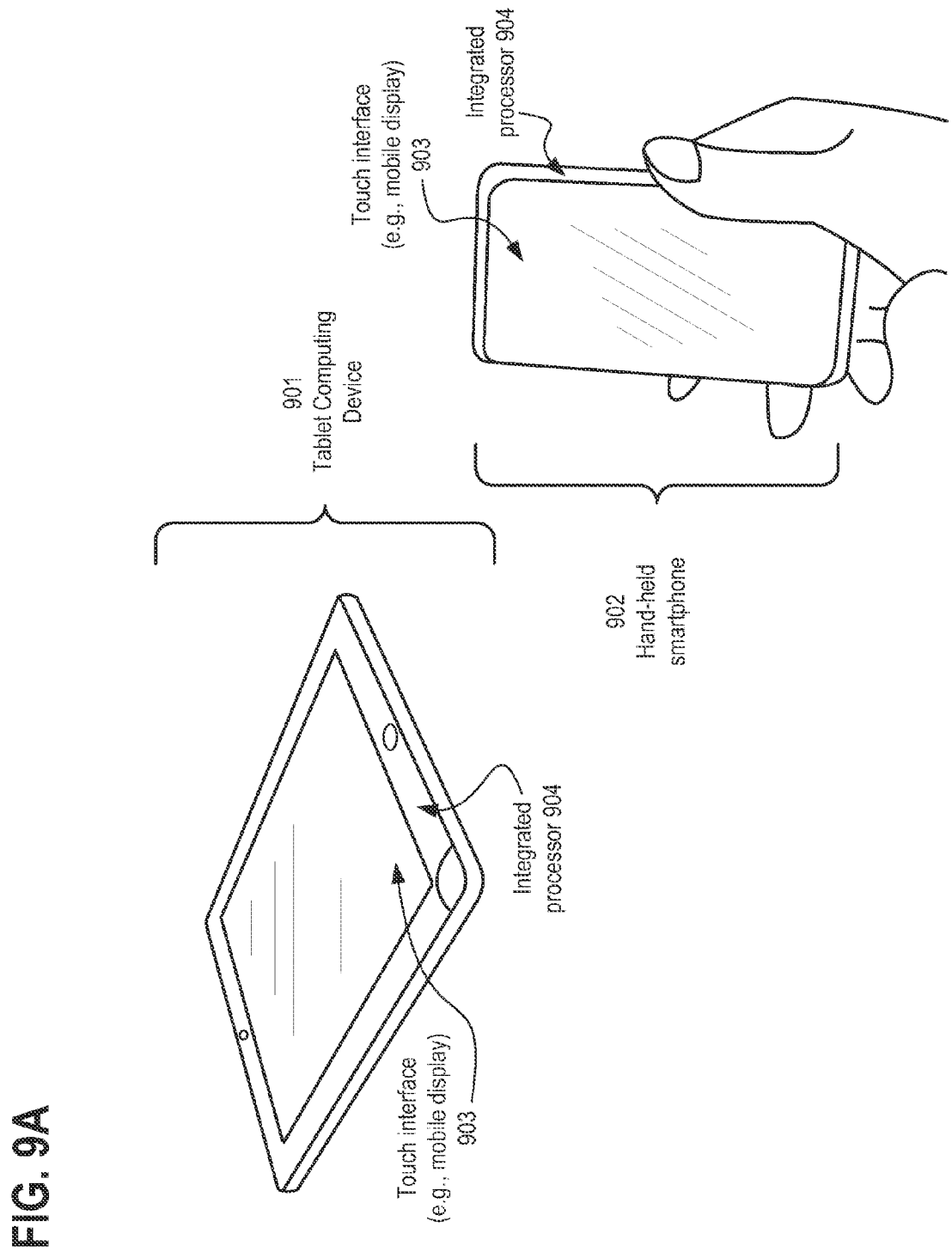
FIG. 9A depicts a tablet computing device and a hand-held smartphone each having a circuitry integrated therein as described in accordance with the embodiments.
Figure 9B:
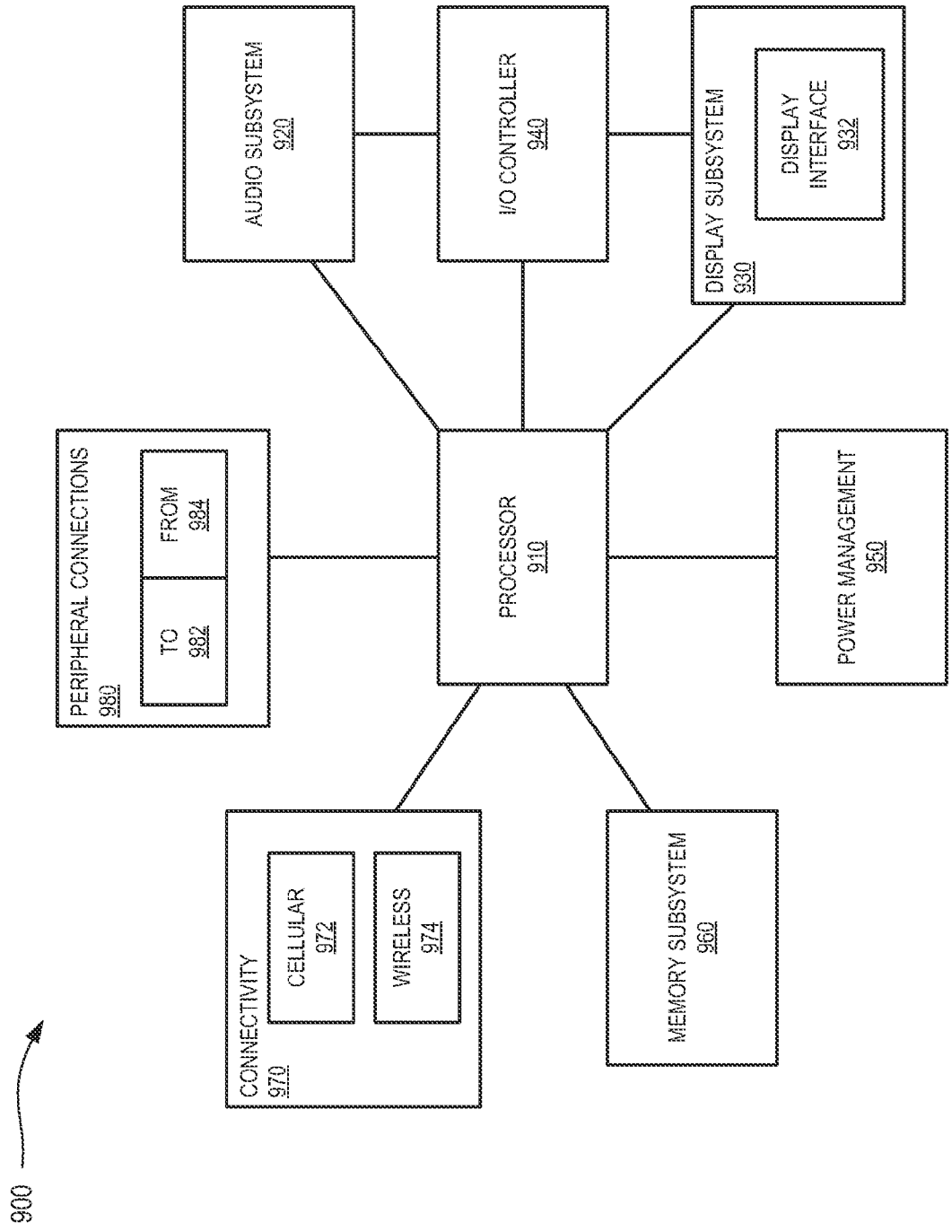
FIG. 9B is a block diagram of an embodiment of tablet computing device, a smart phone, or other mobile device in which touchscreen interface connectors are used.

According to another embodiment, the mobile computing device 500 is embodied within one of a tablet computing device or a hand-held smartphone such as those depicted at FIGS. 9A and 9B.

Figure 6A:
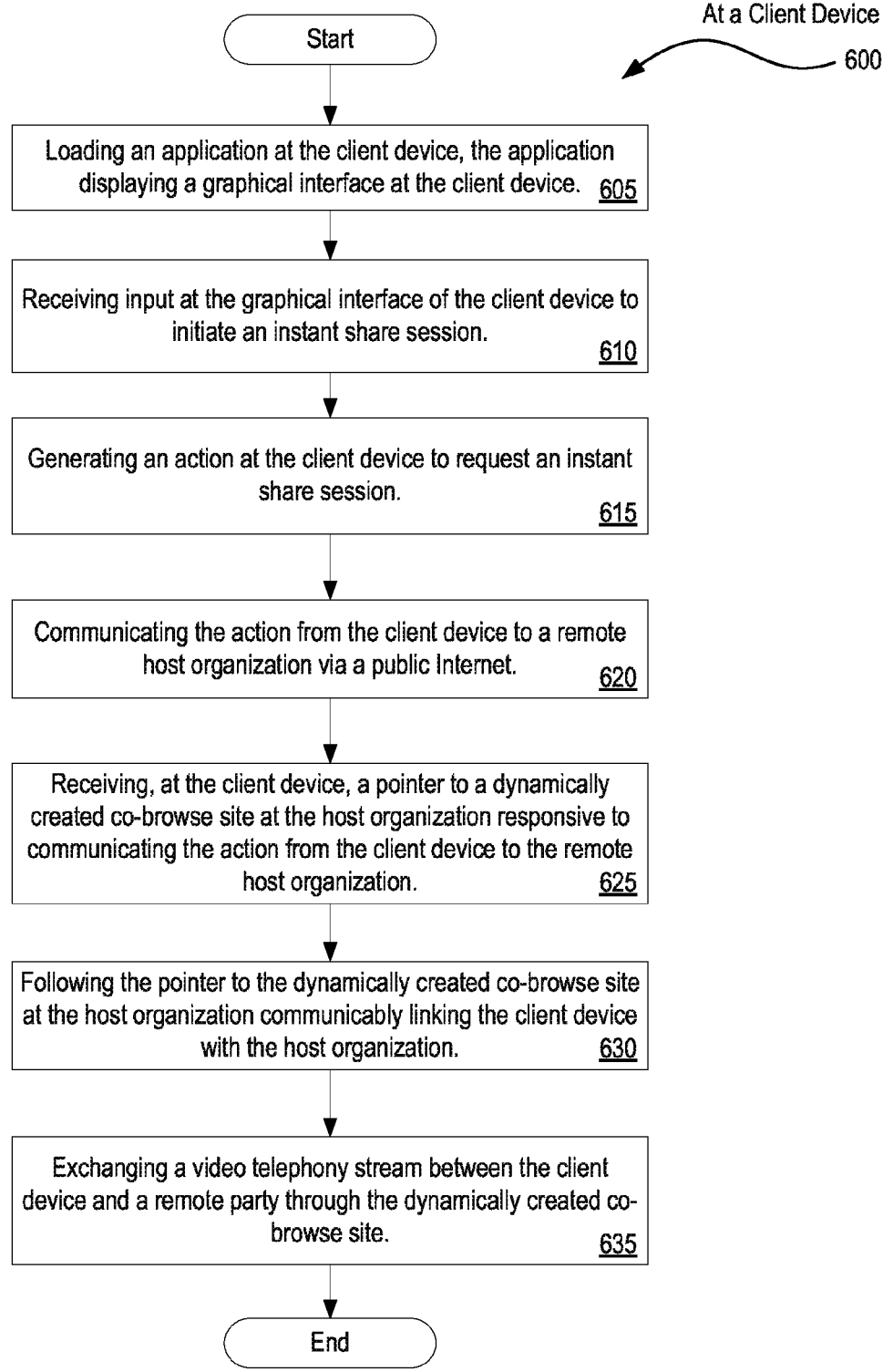
FIG. 6A is a flow diagram illustrating a method at a client device in accordance with disclosed embodiments.
Figure 6B:
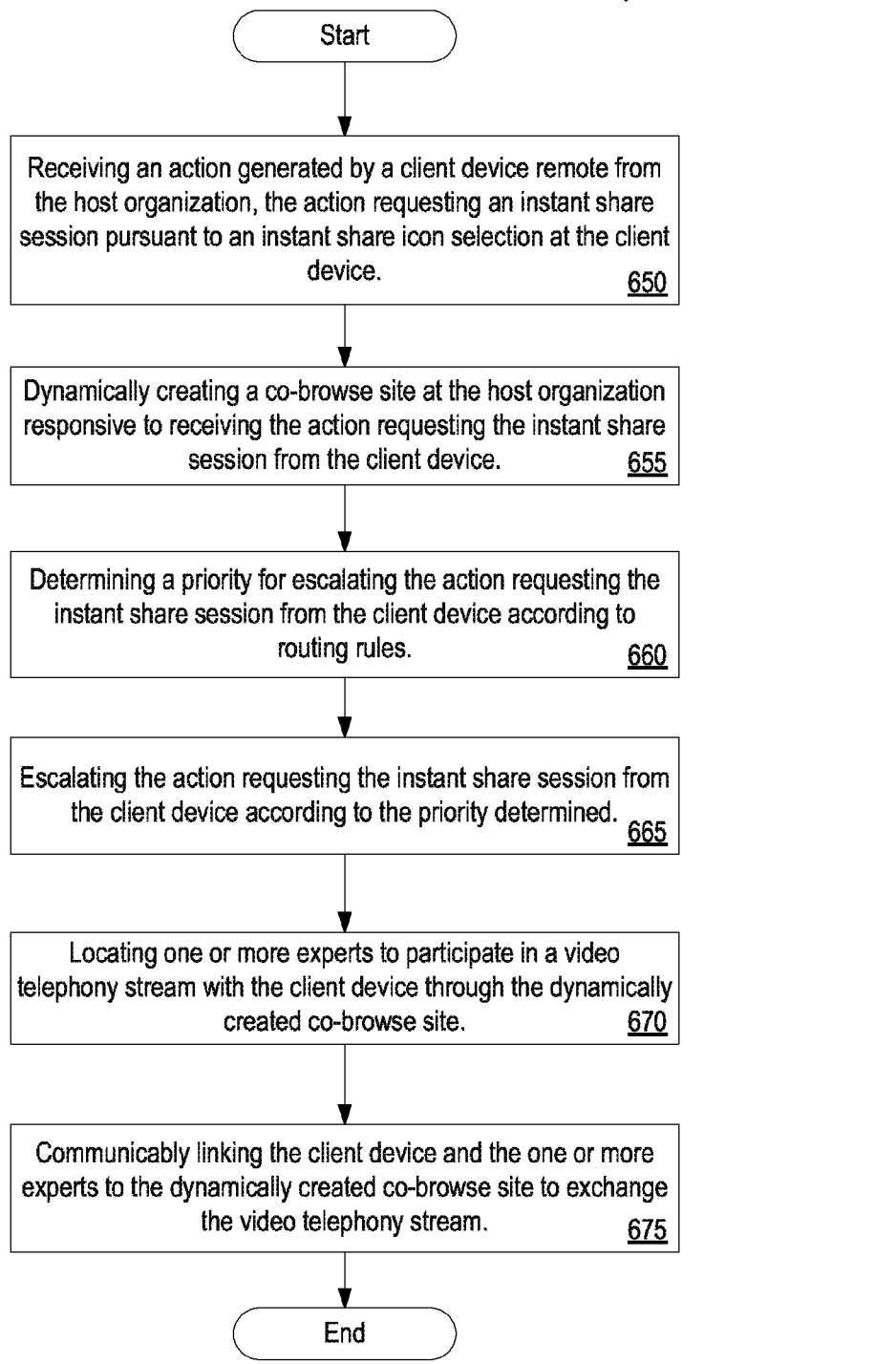
FIG. 6B is a flow diagram illustrating a method at a host organization in accordance with disclosed embodiments.

FIG. 6A is a flow diagram illustrating a method 600 at a client device in accordance with disclosed embodiments. FIG. 6B is a flow diagram illustrating a method 601 at a host organization in accordance with disclosed embodiments. Methods 600 and 601 may be performed by processing logic that may include hardware (e.g., circuitry, dedicated logic, programmable logic, microcode, etc.), software (e.g., instructions run on a processing device to perform various operations such as displaying, communicating, receiving, applying, loading, generating, following, exchanging, executing, capturing, transmitting, sending, etc., in pursuance of the systems, apparatuses, and methods for implementing instant social image cobrowsing through the cloud, as described herein. For example, the computing architecture (e.g., within production environment 111) of host organization 110 as depicted at FIG. 1, machine 800 at FIG. 8, the tablet computing device 901 or hand-held smartphone 902 at FIG. 9, or the mobile computing device 500 at FIG.

5, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to FIG. 6A and method 600 at the client device, processing logic loads an application at the client device, the application displaying a graphical interface at the client device (block 605).

At block 610, processing logic receives input at the graphical interface of the client device to initiate an instant share session.

At block 615, processing logic generates an action at the client device to request an instant share session.

At block 620, processing logic communicates the action from the client device to a remote host organization via a public Internet.

At block 625, processing logic receives, at the client device, a pointer to a dynamically created co-browse site at the host organization responsive to communicating the action from the client device to the remote host organization.

At block 630, processing logic follows the pointer to the dynamically created co-browse site at the host organization communicably linking the client device with the host organization.

At block 635, processing logic exchanges a video telephony stream between the client device and a remote party through the dynamically created co-browse site.

According to another embodiment of method 600, the client device having at least the memory and the processor therein is embodied within one of: a tablet computing device; a hand-held smartphone; and a mobile computing device.

According to another embodiment of method 600, loading an application at the client device, includes one of: loading an android platform compatible mobile application at the client device; loading an iOS platform compatible mobile application at the client device; loading a Windows mobile platform compatible mobile application at the client device; and loading an HTML5 compliant website within a web-browser at the executing at the client device.

According to another embodiment of method 600, loading an application at the client device, includes: loading a mobile application provided by a third party separate from the remote host organization; in which the mobile application is branded by the third party; and in which the mobile application is configured to interface with the remote host organization upon receiving the input at the graphical interface to initiate the instant share session.

According to another embodiment of method 600, the action generated at the client device and communicated to the remote host organization is routed through an escalation path according to routing rules; in which the routing rules determine a priority for escalating the instant share session to a live expert to participate as the remote party in exchanging the video telephony stream with the client device through the dynamically created co-browse site.

According to another embodiment of method 600, the live expert renders a satisfactory solution to a user of the client device via the video telephony stream exchanged between the client device and the remote party through the dynamically created co-browse site; and in which the video telephony stream is recorded by the host organization for later playback.

According to another embodiment of method 600, the recorded video telephony stream is published to a community forum for reference as a solution to a specified problem.

According to another embodiment of method 600, the action generated at the client device and communicated to the remote host organization is: passed to a routing system to determine a priority for escalating the instant share session; passed to an escalation system to apply the priority determined by expediting the request for an instant share session out of turn based on the priority determined; and passed to an expert locator to identify one or more experts to participate as the remote party in exchanging the video telephony stream with the client device through the dynamically created co-browse site.

According to another embodiment of method 600, the experts send an optional invitation to other experts to participate as optional invitees in exchanging the video telephony stream with the client device through the dynamically created co-browse site; and in which the optional invitees accept the optional invitation by following a pointer to the dynamically created co-browse site.

According to another embodiment of method 600, a user of the client device sends an optional invitation to other users to participate as optional invitees in exchanging the video telephony stream with the client device through the dynamically created co-browse site; and in which the optional invitees accept the optional invitation by following a pointer to the dynamically created co-browse site.

According to another embodiment of method 600, the optional invitation to the other users to participate as optional invitees include at least one of: friends from a social networking site; professional colleagues from a business social networking site; other users from a support forum or web community; and co-workers from an enterprise networking site.

According to another embodiment of method 600, receiving input at the graphical interface of the client device to initiate an instant share session includes: receiving a user input at an instant share icon displayed upon the graphical interface of the client device.

According to another embodiment of method 600, exchanging a video telephony stream between the client device and a remote party through the dynamically created co-browse site includes exchanging one or more of: audio captured at the client device; a user's voice and speech captured at the client device; video captured at the client device; audio communicated from the remote party through the dynamically created co-browse site to the client device; video communicated from the remote party through the dynamically created co-browse site to the client device; and still images or documents communicated from the remote party through the dynamically created co-browse site to the client device.

According to another embodiment of method 600, an intelligence module applies video parsing and analysis to the video telephony stream exchanged between the client device and the remote party through the dynamically created co-browse site.

According to another embodiment of method 600: the intelligence module identifies a recommended solution based on the video parsing and analysis applied to the video telephony stream; and in which the intelligence module pushes the recommended solution to a user of the client device or publishes the recommended solution to a community forum for reference as a solution to a specified problem, or both.

According to another embodiment, method 600 further includes: authenticating a user of the client device with the host organization as a known subscriber; and determining a priority for escalating the instant share session to a live expert to participate as the remote party in exchanging the video telephony stream with the client device through the dynamically created co-browse site based on one of: a UserID of the authenticated user; a product affiliation of the authenticated user; an OrgID to which the authenticated user belongs; a Service Level Agreement contracted with the authenticated user; a paid subscription plan as purchased by the authenticated user; and a calculated customer value score determined by the host organization and correlated to the authenticated user.

According to another embodiment, method 600 further includes: sending an optional invitation to a second client computing device; accepting the optional invitation at the second client computing device to join the second client computing device into the video telephony stream with the client device through the dynamically created co-browse site; displaying video originated by the remote party at a display of the second client device; and displaying video originated by the client device upon the graphical interface displayed to the client device.

According to a particular embodiment, there is non-transitory computer readable storage media having instructions stored thereon that, when executed by a processor of a client device, the instructions cause the client device to perform operations including: loading an application at the client device, the application displaying a graphical interface at the client device; receiving input at the graphical interface of the client device to initiate an instant share session; generating an action at the client device to request an instant share session; communicating the action from the client device to a remote host organization via a public Internet; receiving, at the client device, a pointer to a dynamically created co-browse site at the host organization responsive to communicating the action from the client device to the remote host organization; following the pointer to the dynamically created co-browse site at the host organization communicably linking the client device with the host organization; and exchanging a video telephony stream between the client device and a remote party through the dynamically created co-browse site With reference to FIG. 6B and method 601 at the host organization, processing logic receives an action generated by a client device remote from the host organization, the action requesting an instant share session pursuant to an instant share icon selection at the client device (block 650).

At block 655, processing logic dynamically creates a co-browse site at the host organization responsive to receiving the action requesting the instant share session from the client device.

At block 660, processing logic determines a priority for escalating the action requesting the instant share session from the client device according to routing rules.

At block 665, processing logic escalates the action requesting the instant share session from the client device according to the priority determined.

At block 670, processing logic locates one or more experts to participate in a video telephony stream with the client device through the dynamically created co-browse site.

At block 675, processing logic communicably links the client device and the one or more experts to the dynamically created co-browse site to exchange the video telephony stream.

According to another embodiment, method 601 further includes: applying video parsing and analysis to the video telephony stream exchanged between the client device and the remote party through the dynamically created co-browse site to identify a recommended solution; pushing the recommended solution to the client device or publishing the recommended solution to a community forum for reference as a solution to a specified problem, or both.

According to another embodiment, method 601 further includes: recording the video telephony stream between the client device and the remote party as the video telephony stream progresses between the client device and the remote party; storing the recorded video telephony stream within a multi-tenant database system of the host organization as the video telephony stream progresses; and sharing the recorded video telephony stream with a community forum as a solution to a problem.

According to another embodiment of method 601, the recorded video telephony stream is controllable by a viewer of a second client device remote from the host organization while the video telephony stream progresses between the first client device and the remote party, wherein controlling the video telephony stream by the viewer of the second client device includes one or more of: (i) pausing the video telephony stream at the second client device as it progresses between the first client device and the remote party; (ii) playing forward the video telephony stream at the second client device as it progresses between the first client device and the remote party; (iii) rewinding the video telephony stream at the second client device for review as the video telephony stream progresses between the first client device and the remote party; and (iv) fast forwarding the video telephony stream at the second client device as it progresses between the first client device and the remote party up to a the video telephony stream at the second client having a concurrent position with the video telephony stream at the first client device.

According to another embodiment of method 601, determining a priority for escalating the action requesting the instant share session from the client device according to routing rules includes: determining the priority for escalating the action based on one or more of: a UserID of the of a user associated with the client device; a product determined from a user associated with the client device; an OrgID to which a user associated with the client device belongs; a Service Level Agreement contracted with a user associated with the client device; a paid subscription plan as purchased by a user associated with the client device; and a calculated customer value score for a user associated with the client device as determined by the host organization.

According to another embodiment of method 601, communicably linking the client device and the one or more experts to the dynamically created co-browse site to exchange the video telephony stream, includes: sending a pointer to each of the client device and the one or more experts, the pointer pointing to the dynamically created co-browse site; and receiving incoming connections at the dynamically created co-browse site responsive to the pointer sent to each of the client device and the one or more experts.

According to another embodiment of method 601, the client device is embodied within one of: a tablet computing device; a hand-held smartphone; and a mobile computing device.

According to another embodiment of method 601, the host organization implements the method via computing architecture of the host organization including at least a processor and a memory; in which the host organization operates as a cloud based service provider to the client device; and in which the host organization provides a multi-tenant database system via the databases and the computing architecture of the host organization, the multi-tenant database system having elements of hardware and software that are shared by a plurality of separate and distinct customer organizations, each of the separate and distinct customer organizations being remotely located from the host organization.

According to a particular embodiment, there is non-transitory computer readable storage media having instructions stored thereon that, when executed by a processor of a host organization, the instructions cause the host organization to perform operations including: receiving an action generated by a client device remote from the host organization, the action requesting an instant share session pursuant to an instant share icon selection at the client device; dynamically creating a co-browse site at the host organization responsive to receiving the action requesting the instant share session from the client device; determining a priority for escalating the action requesting the instant share session from the client device according to routing rules; escalating the action requesting the instant share session from the client device according to the priority determined; locating one or more experts to participate in a video telephony stream with the client device through the dynamically created co-browse site; communicably linking the client device and the one or more experts to the dynamically created co-browse site to exchange the video telephony stream.

Figure 7A:
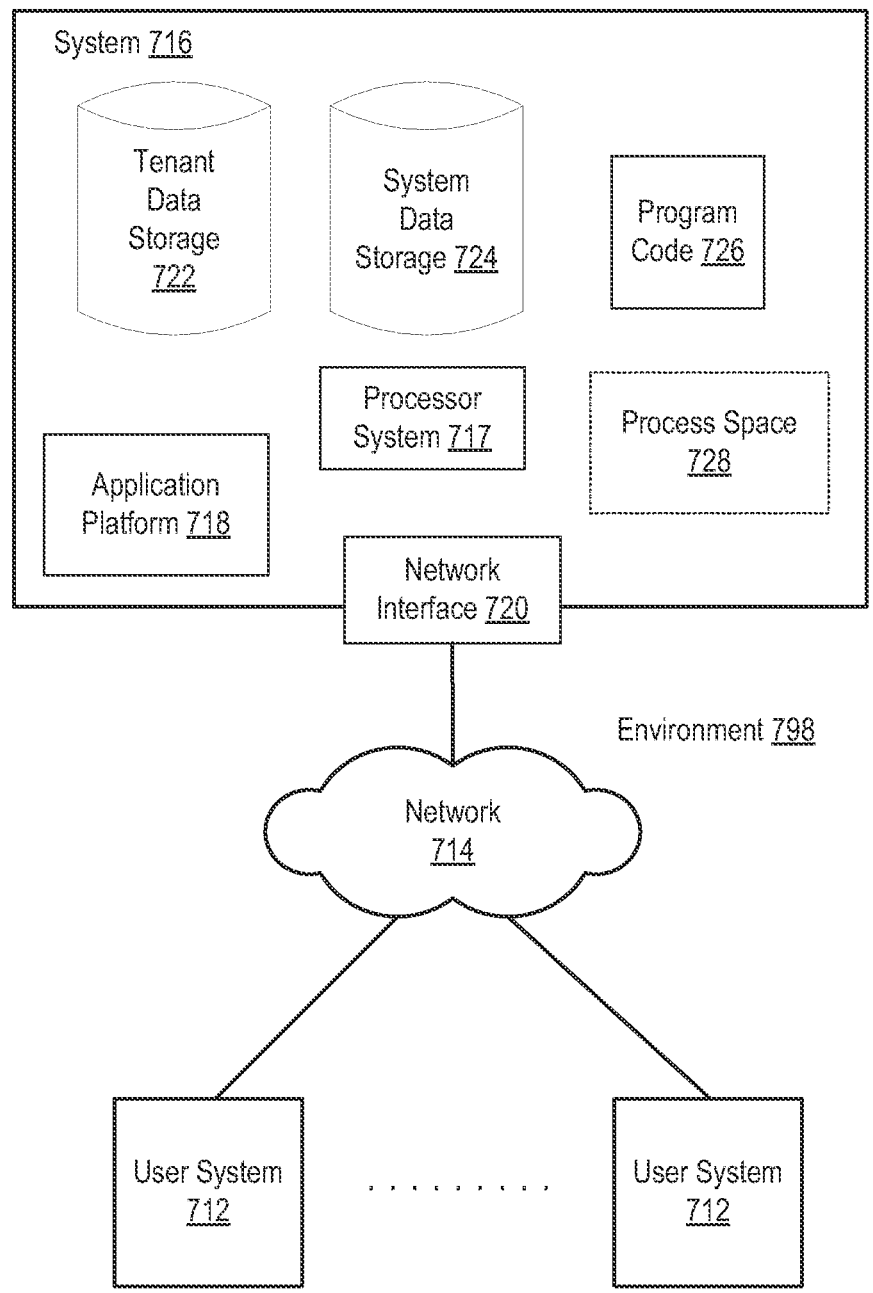
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
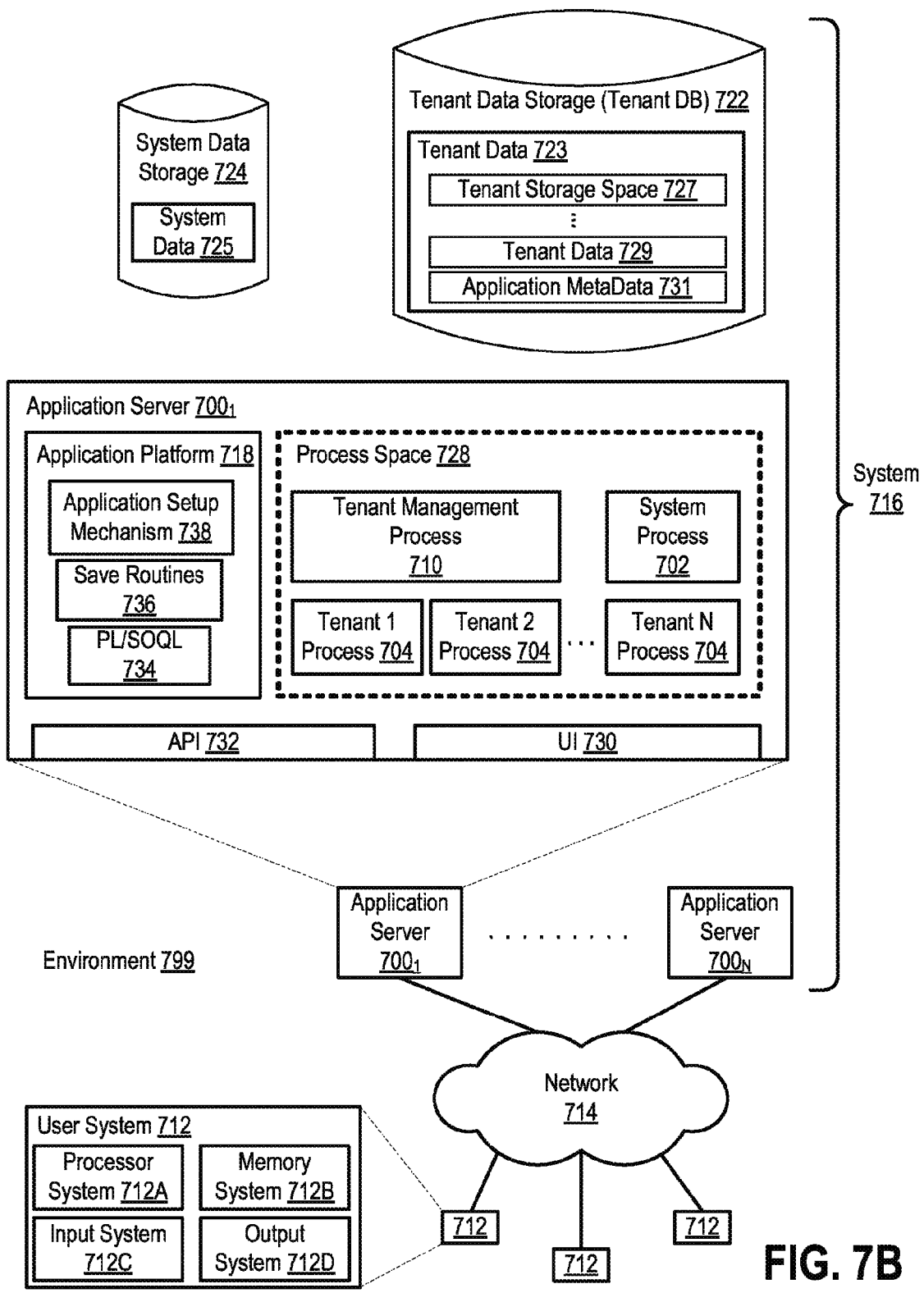
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage area 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes mobile application 824, an instant share request 823, and pointer 825 to a dynamically created co-browsing site which may then be followed to connect with the dynamically created co-browse site. Main memory 804 and its sub-elements are operable in conjunction with processing logic 826 and processor 802 to perform the methodologies discussed herein. The computer system 800 may additionally or alternatively embody the server side elements as described above.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

FIG. 9A depicts a tablet computing device 901 and a hand-held smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for displaying and filtering business analytics data stored in the cloud and interfacing to an on-demand and/or multi-tenant database system such as a cloud computing service provided via a public Internet as a subscription service. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

FIG. 9B is a block diagram 900 of an embodiment of tablet computing device, a smart phone, or other mobile device in which touchscreen interface connectors are used. Processor 910 performs the primary processing operations. Audio subsystem 920 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 910.

Display subsystem 930 represents hardware (e.g., display devices) and software (e.g., drivers) components that provide a visual and/or tactile display for a user to interact with the tablet computing device or smart phone. Display subsystem 930 includes display interface 932, which includes the particular screen or hardware device used to provide a display to a user. In one embodiment, display subsystem 930 includes a touchscreen device that provides both output and input to a user.

I/O controller 940 represents hardware devices and software components related to interaction with a user. I/O controller 940 can operate to manage hardware that is part of an audio subsystem 920 and/or display subsystem 930. Additionally, I/O controller 940 illustrates a connection point for additional devices that connect to the tablet computing device or smart phone through which a user might interact. In one embodiment, I/O controller 940 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 950 that manages battery power usage, charging of the battery, and features related to power saving operation. Memory subsystem 960 includes memory devices for storing information in the tablet computing device or smart phone. Connectivity 970 includes hardware devices (e.g., wireless and/or wired connectors and communication hardware) and software components (e.g., drivers, protocol stacks) to the tablet computing device or smart phone to communicate with external devices. Cellular connectivity 972 may include, for example, wireless carriers such as GSM (global system for mobile communications), CDMA (code division multiple access), TDM (time division multiplexing), or other cellular service standards). Wireless connectivity 974 may include, for example, activity that is not cellular, such as personal area networks (e.g., Bluetooth), local area networks (e.g., WiFi), and/or wide area networks (e.g., WiMax), or other wireless communication.

Peripheral connections 980 include hardware interfaces and connectors, as well as software components (e.g., drivers, protocol stacks) to make peripheral connections as a peripheral device ("to" 982) to other computing devices, as well as have peripheral devices ("from" 984) connected to the tablet computing device or smart phone, including, for example, a "docking" connector to connect with other computing devices. Peripheral connections 980 include common or standards-based connectors, such as a Universal Serial Bus (USB) connector, DisplayPort including MiniDisplayPort (MDP), High Definition Multimedia Interface (HDMI), Firewire, etc.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method at a client device having at least a processor and a memory therein, wherein the method comprises:
   loading an application at the client device, the application displaying a graphical interface at the client device;
   receiving input at the graphical interface of the client device to initiate an instant share session;
   generating an action at the client device to request an instant share session;
   communicating the action from the client device to a remote host organization via a public Internet, wherein the action from the client device causes the remote host organization to include an expert or support person to participate as a remote party in the instant share session with the client device by exchanging a video telephony stream with the client device through a dynamically created co-browse site;
   receiving, at the client device, a pointer to the dynamically created co-browse site at the remote host organization responsive to communicating the action from the client device to the remote host organization;
   following the pointer to the dynamically created co-browse site at the remote host organization communicably linking the client device with the remote host organization to join the client device to the instant share session;
   exchanging the video telephony stream between the client device and the remote party through the dynamically created co-browse site, wherein the client device and the remote party are each participants of the instant share session;
   wherein the expert or support person renders a solution to a user of the client device via the video telephony stream exchanged between the client device and the remote party through the dynamically created co-browse site.

2. The method of claim 1, wherein the client device having at least the memory and the processor therein is embodied within one of:
   a tablet computing device;
   a hand-held smartphone; and
   a mobile computing device.

3. The method of claim 1, wherein loading an application at the client device, comprises one of:
   loading an android platform compatible mobile application at the client device;
   loading an iOS platform compatible mobile application at the client device;
   loading a Windows mobile platform compatible mobile application at the client device; and
   loading an HTML5 compliant website within a web-browser at the executing at the client device.

4. The method of claim 1, wherein loading an application at the client device, comprises:
   loading a mobile application provided by a third party separate from the remote host organization;
   wherein the mobile application is branded by the third party; and
   wherein the mobile application is configured to interface with the remote host organization upon receiving the input at the graphical interface to initiate the instant share session.

5. The method of claim 1:
   wherein the action generated at the client device and communicated to the remote host organization is routed through an escalation path according to routing rules;
   wherein the routing rules determine a priority for escalating the instant share session to the expert or support person to participate as the remote party in exchanging the video telephony stream with the client device through the dynamically created co-browse site.

6. The method of claim 5:
   wherein the video telephony stream is recorded by the host organization for later playback.

7. The method of claim 6, wherein the recorded video telephony stream is published to a community forum for reference as a solution to a specified problem.

8. The method of claim 1:
wherein the action generated at the client device and communicated to the remote host organization is:
passed to a routing system to determine a priority for escalating the instant share session;
passed to an escalation system to apply the priority determined by expediting the request for the instant share session out of turn based on the priority determined; and
passed to an expert locator to identify one or more experts to participate as the remote party in exchanging the video telephony stream with the client device through the dynamically created co-browse site.

9. The method of claim 8:
wherein the experts send an optional invitation to other experts to participate as optional invitees in exchanging the video telephony stream with the client device through the dynamically created co-browse site; and
wherein the optional invitees accept the optional invitation by following a pointer to the dynamically created co-browse site.

10. The method of claim 8:
wherein a user of the client device sends an optional invitation to other users to participate as optional invitees in exchanging the video telephony stream with the client device through the dynamically created co-browse site; and
wherein the optional invitees accept the optional invitation by following a pointer to the dynamically created co-browse site.

11. A method in a host organization having at least a processor and a memory therein, wherein the method comprises, wherein the method comprises:
receiving an action generated by a client device remote from the host organization, the action requesting an instant share session pursuant to an instant share icon selection at the client device;
dynamically creating a co-browse site at the host organization responsive to receiving the action requesting the instant share session from the client device;
including an expert or support person to participate as a remote party in the instant share session with the client device by exchanging a video telephony stream with the client device through the dynamically created co-browse site;
returning, to the client device, a pointer to the dynamically created co-browse site at the host organization responsive to the action from the client device received at the host organization, wherein the client is to follow the pointer to the dynamically created co-browse site at the host organization communicably linking the client device with the host organization to join the client device to the instant share session;
exchanging the video telephony stream between the client device and the remote party through the dynamically created co-browse site, wherein the client device and the remote party are each participants of the instant share session;
wherein the expert or support person renders a solution to a user of the client device via the video telephony stream exchanged between the client device and the remote party through the dynamically created co-browse site.

12. The method of claim 11:
wherein the action generated at the client device and communicated to the host organization is routed through an escalation path according to routing rules;
wherein the routing rules determine a priority for escalating the instant share session to the expert or support person to participate as the remote party in exchanging the video telephony stream with the client device through the dynamically created co-browse site.

13. The method of claim 11, further comprising:
recording the video telephony stream at the host organization for later playback; and
publishing the recorded video telephony stream to a community forum for reference as a solution to a specified problem.

14. The method of claim 11:
wherein the action generated at the client device and communicated to the remote host organization is:
passed to a routing system to determine a priority for escalating the instant share session;
passed to an escalation system to apply the priority determined by expediting the request for the instant share session out of turn based on the priority determined; and
passed to an expert locator to identify one or more experts to participate as the remote party in exchanging the video telephony stream with the client device through the dynamically created co-browse site.

15. Non-transitory computer readable storage media having instructions stored thereon that, when executed by a processor of a client device, the instructions cause the client device to perform operations including:
loading an application at the client device, the application displaying a graphical interface at the client device;
receiving input at the graphical interface of the client device to initiate an instant share session;
generating an action at the client device to request an instant share session;
communicating the action from the client device to a host organization remote from the client device via a public Internet, wherein the action from the client device causes the host organization to include an expert or support person to participate as a remote party in the instant share session with the client device by exchanging a video telephony stream with the client device through a dynamically created co-browse site;
receiving, at the client device, a pointer to the dynamically created co-browse site at the host organization responsive to communicating the action from the client device to the host organization;
following the pointer to the dynamically created co-browse site at the host organization communicably linking the client device with the host organization to join the client device to the instant share session;
exchanging the video telephony stream between the client device and the remote party through the dynamically created co-browse site, wherein the client device and the remote party are each participants of the instant share session;
wherein the expert or support person renders a solution to a user of the client device via the video telephony stream exchanged between the client device and the remote party through the dynamically created co-browse site.

16. The non-transitory computer readable storage media of claim 15:
wherein the action generated at the client device and communicated to the host organization is routed through an escalation path according to routing rules;
wherein the routing rules determine a priority for escalating the instant share session to the expert or support person to participate as the remote party in exchanging the video telephony stream with the client device through the dynamically created co-browse site.

17. The non-transitory computer readable storage media of claim 15, wherein the instructions cause the client device to perform operations further including:
recording the video telephony stream at the host organization for later playback; and
publishing the recorded video telephony stream to a community forum for reference as a solution to a specified problem.

18. The non-transitory computer readable storage media of claim 15:
wherein the action generated at the client device and communicated to the remote host organization is:
passed to a routing system to determine a priority for escalating the instant share session;
passed to an escalation system to apply the priority determined by expediting the request for the instant share session out of turn based on the priority determined; and
passed to an expert locator to identify one or more experts to participate as the remote party in exchanging the video telephony stream with the client device through the dynamically created co-browse site.

19. A mobile computing device comprising:
a processor and a memory to execute instructions at the mobile computing device;
a touchscreen to display a graphical interface at the mobile computing device;
the processor to load an application at the mobile computing device, the application displaying a graphical interface at the mobile computing device;
the touchscreen of the mobile computing device to receive input to initiate an instant share session;
the application to generate an action at the mobile computing device to request an instant share session;
a network interface to communicate the action from the mobile computing device to a host organization remote from the mobile computing device via a public Internet, wherein the action from the mobile computing device causes the host organization to include an expert or support person to participate as a remote party in the instant share session with the mobile computing device by exchanging a video telephony stream with the mobile computing device through a dynamically created co-browse site;
the network interface to receive a pointer to the dynamically created co-browse site at the host organization responsive to communicating the action from the mobile computing device to the host organization;
the application to follow the pointer to the dynamically created co-browse site at the host organization communicably linking the mobile computing device with the host organization to join the mobile computing device to the instant share session;
the application to exchange the video telephony stream between the mobile computing device and the remote party through the dynamically created co-browse site, wherein the mobile computing device and the remote party are each participants of the instant share session;
wherein the expert renders a solution to a user of the mobile computing device via the video telephony stream exchanged between the mobile computing device and the remote party through the dynamically created co-browse site.

20. The mobile computing device of claim 19:
wherein the mobile computing device is embodied within one of a tablet computing device and a hand-held smartphone; and
wherein the processor to load the application at the mobile computing device comprises the processor to perform one of the following operations at the client device: loading an android platform compatible mobile application at the mobile computing device, loading an iOS platform compatible mobile application at the mobile computing device, loading a Windows mobile platform compatible mobile application at the mobile computing device, or loading an HTML5 compliant website within a web-browser at the executing at the mobile computing device.

* * * * *